United States Patent
Lee

(10) Patent No.: US 9,503,710 B2
(45) Date of Patent: Nov. 22, 2016

(54) MOBILE TERMINAL AND METHOD OF CONTROLLING THE SIMULTANEOUS DISPLAY OF 2D AND 3D IMAGES

(75) Inventor: Jinsool Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 961 days.

(21) Appl. No.: 13/288,453

(22) Filed: Nov. 3, 2011

(65) Prior Publication Data

US 2012/0113105 A1   May 10, 2012

(30) Foreign Application Priority Data

Nov. 5, 2010 (KR) .................. 10-2010-0109570

(51) Int. Cl.
| | | |
|---|---|---|
| G06F 3/048 | (2013.01) | |
| H04N 13/04 | (2006.01) | |
| G09G 3/00 | (2006.01) | |
| G06F 1/16 | (2006.01) | |

(52) U.S. Cl.
CPC ........ *H04N 13/0452* (2013.01); *G06F 1/1686* (2013.01); *G09G 3/003* (2013.01); *H04N 13/0497* (2013.01)

(58) Field of Classification Search
CPC .............. G06F 3/04817; G06F 3/0482; H04N 13/0454; H04N 13/0289; H04N 13/0292; H04N 1/00453; H04N 1/00458; H04N 2013/0465
USPC ....................................... 715/848
See application file for complete search history.

(56) References Cited

U.S. PATENT DOCUMENTS

| | | | |
|---|---|---|---|
| 2004/0056981 A1* | 3/2004 | Hamamura et al. | 348/578 |
| 2004/0070673 A1* | 4/2004 | Nakamura | 348/207.2 |
| 2007/0242068 A1* | 10/2007 | Han et al. | 345/419 |
| 2008/0158384 A1* | 7/2008 | Okamoto et al. | 348/231.2 |
| 2009/0103833 A1 | 4/2009 | Mitsuhashi et al. | |
| 2009/0303204 A1* | 12/2009 | Nasiri et al. | 715/856 |
| 2011/0018977 A1* | 1/2011 | Nakamaru | 348/51 |
| 2011/0126160 A1* | 5/2011 | Han et al. | 715/848 |
| 2011/0194756 A1* | 8/2011 | Morifuji | H04N 13/0003 382/154 |
| 2012/0007892 A1* | 1/2012 | Ohkubo et al. | 345/667 |

(Continued)

FOREIGN PATENT DOCUMENTS

| | | |
|---|---|---|
| EP | 1 406 456 A2 | 4/2004 |
| EP | 1 737 248 A2 | 12/2006 |
| JP | 2006-121553 A | 5/2006 |

OTHER PUBLICATIONS

Guan Qun Chen, "Monitoring 3D camera rigs for film production" Sep. 1, 2010, XP055159794, pp. 1-63, Master's thesis, University of Dublin, Trinity College.

*Primary Examiner* — Jennifer To
*Assistant Examiner* — Joseph R Burwell
(74) *Attorney, Agent, or Firm* — Birch, Stewart, Kolasch & Birch, LLP

(57) ABSTRACT

A mobile terminal includes a memory configured to store at least one 2-dimensional (2D) image and at least one 3-dimensional (3D) image. A display unit is configured to display the images. A controller is configured to control the display unit to display a list including the at least one 2D image and the at least one 3D image when a command for displaying the list is input, and to control at least one image being one of the 2D image or the 3D image distinguishably displayed from another of the 2D image or the 3D image.

16 Claims, 28 Drawing Sheets

(56) References Cited

U.S. PATENT DOCUMENTS

2012/0038625 A1* 2/2012 Kim .............................. 345/419
2012/0062554 A1* 3/2012 Ueno et al. ................... 345/419
2012/0092338 A1* 4/2012 Ogishima et al. ............ 345/419
2012/0139904 A1* 6/2012 Lee et al. ...................... 345/419

* cited by examiner (a)

(b)

List to be displayed
(a)

Sort 2D images and 3D images separately
(b)

List to be displayed
(a)

Identify 3D images using histograms
(b)

3D display mode
(a)

3D display mode
(b)

MOBILE TERMINAL AND METHOD OF CONTROLLING THE SIMULTANEOUS DISPLAY OF 2D AND 3D IMAGES

Pursuant to 35 U.S.C. §119(a), this application claims the benefit of earlier filing date and right of priority to Korean Application No. 10-2010-0109570, filed on Nov. 5, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a user to use a terminal in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or absence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, as 3-dimensional (hereinafter abbreviated 3D) is implemented on a display unit of a terminal, the demands for providing various functions using the 3D image are increasing.

In particular, a plurality of cameras for photographing left and right eye images are provided to a mobile terminal. And, a 3D image can be generated using the left and right eye images input from the cameras.

SUMMARY OF THE INVENTION

Accordingly, the present invention is directed to a mobile terminal and 3D image controlling method thereof that substantially obviate one or more problems due to limitations and disadvantages of the related art.

An object of the present invention is to provide a mobile terminal and controlling method thereof as follows. First of all, when a list of 2D and 3D images is displayed as thumbnails in a mobile terminal, it may be checked whether a display mode of a display unit is a 2D display mode or a 3D display mode. And, the images having the same dimensions of the checked display mode may be displayed as being emphasized more than the rest of the images having a mode different from the checked display mode.

An object of the present invention is to provide a mobile terminal and controlling method thereof as follows. After a list of 2D and 3D images has been displayed as thumbnails in a mobile terminal, the images having one of 2D and 3D in the list may be displayed as emphasized more than the rest of the images having other dimensions in accordance with user manipulation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory configured to store at least two 2-dimensional (hereinafter abbreviated 2D) images and at least two 3-dimensional (hereinafter abbreviated 3D) images, a display unit configured to display the images, and a controller configured to control the display unit to display a list including the 2D images and the 3D images when a command for displaying the list is input, and to control at least one image having dimensions of one of the 2D images and the 3D images to be identified from at least one image having different dimensions within the list.

A memory stores at least two 2-dimensional (hereinafter abbreviated 2D) images and at least two 3-dimensional (hereinafter abbreviated 3D) images, a display unit displaying the images, and a controller. If a command for displaying a list of the images is input, controlling a list including the 2D images and the 3D images therein to be displayed on the display unit, the controller controls at least one image having dimensions of one of the 2D and the 3D to be identified from at least one image having different dimensions within the list.

In another aspect of the present invention, a method of controlling a mobile terminal according to the present invention includes the steps of detecting whether a command for displaying a list including at least two 2-dimensional (hereinafter abbreviated 2D) images and at least two 3-dimensional (hereinafter abbreviated 3D) images is input, displaying the list including the 2D images and the 3D images when the command is input, and controlling at least one image having dimensions of one of the 2D and the 3D to be identified from at least one image having different dimensions within the list.

The invention also includes detecting whether a command for displaying a list including at least two 2-dimensional (hereinafter abbreviated 2D) images and at least two 3-dimensional (hereinafter abbreviated 3D) images is input, if the command is input, displaying the list including the 2D images and the 3D images, and controlling at least one image having dimensions of one of the 2D images and the 3D images to be identified from at least one image having different dimensions within the list.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals.

Figure 1:
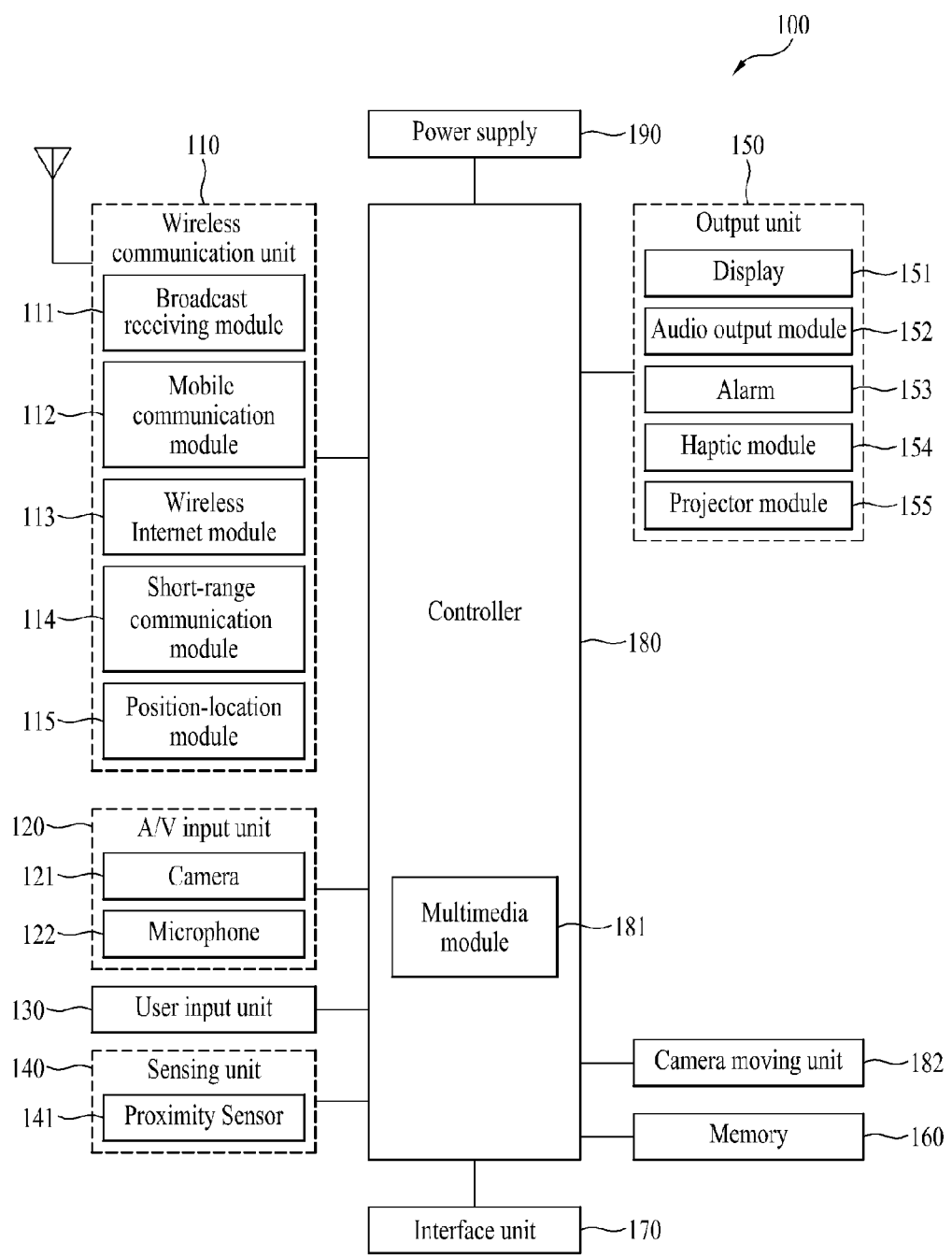
FIG. 1 is a block diagram of a mobile terminal according to an exemplary embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an audio/video (A/V) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message, among others.

The wireless internet module 113 supports Internet access for the mobile terminal 100. This module may be internally or externally coupled to the mobile terminal 100. In this case, the wireless Internet technology can include Wireless LAN (WLAN), Wi-Fi, Wireless broadband (Wibro), World Interoperability for Microwave Access (Wimax), High Speed Downlink Packet Access (HSDPA), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the A/V input unit 120 is configured to provide audio or video signal input to the mobile terminal 100. As shown, the A/V input unit 120 includes a camera 121 and a microphone 122. The camera 121 possesses a digital zoom and processes image frames of still pictures or video, which are obtained by an image sensor in a video call mode or a photographing mode. And, the processed image frames can be displayed on the display 151. The image frames processed by the camera 121 can be stored in the memory 160 or can be externally transmitted via the wireless communication unit 110.

Figure 2A:
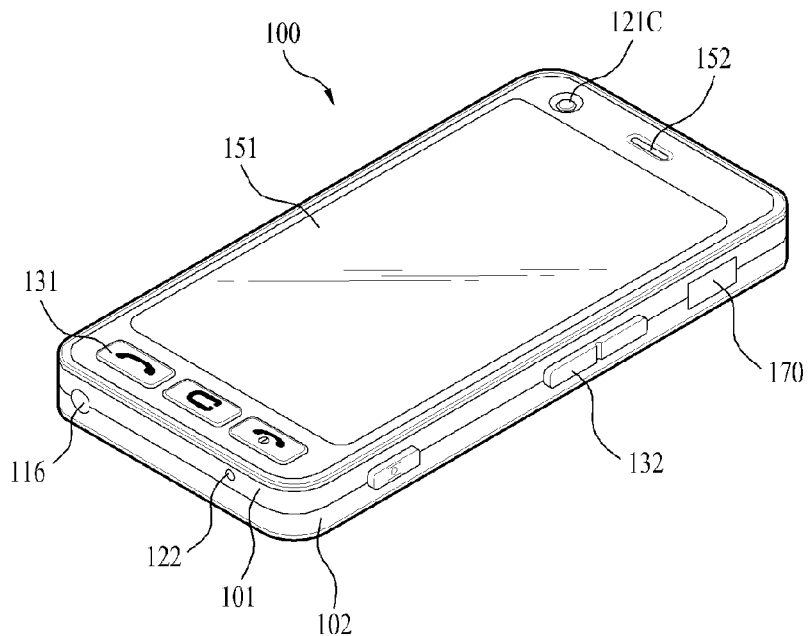
FIG. 2A illustrates a front perspective view of a mobile terminal according to an exemplary embodiment of the present invention.
Figure 2B:
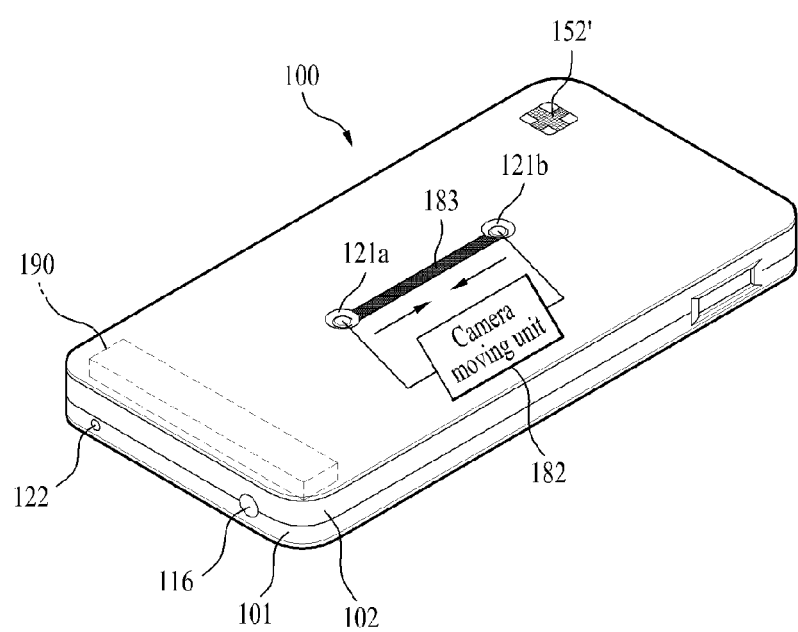
FIG. 2B illustrates a rear perspective view of the mobile terminal of FIG. 2A.

Optionally, as shown in FIGS. 2A and 2B, at least two cameras 121 can be provided to the mobile terminal 100 according to environment of usage. For instance, the camera 121 can include a first camera 121a and a second camera 121b provided for 3D image photographing at a surface of a mobile terminal opposite to another face of the mobile terminal on which the display unit 151 of the mobile terminal 100 is located. A third camera 121c for user's self-photographing can be provided at a prescribed region of the face provided with the display unit 151 of the mobile terminal 100. In this arrangement, the first camera 121a is provided for photographing a left-eye image as a source image of a 3D image, while the second camera 121b is provided for photographing a right-eye image as a source image of the 3D image, for example.

Referring again to FIG. 1, the microphone 122 receives an external audio signal while the mobile terminal 100 is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, if the mobile terminal 100 is configured as a slide-type mobile terminal, the sensing unit 140 may sense whether a sliding portion of the mobile terminal 100 is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141 and a motion sensor 142.

The motion sensor 142 detects a body motion of the mobile terminal 100. The motion sensor 142 outputs a signal corresponding to the detected body motion to the controller 180.

The output unit 150 generates outputs relevant to the senses of sight, hearing, touch and the like. Accordingly, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI, or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays. Some of the above displays can be implemented in a transparent or optical transmittive type, which can be named a transparent display. As a representative example for the transparent display, there is transparent OLED (TOLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 as spaced apart from each other or being built in one body. Alternatively, a plurality of displays can be arranged on different faces of the mobile terminal 100.

In case that the display 151 and a sensor for detecting a touch action (hereinafter called 'touch sensor') is arranged as a mutual layer structure (hereinafter called 'touch screen'), a user is able to use the display 151 as an input device as well as an output device. In this case, the touch sensor can be configured as a touch film, a touch sheet, a touch pad or the like. The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touch screen or around the touch screen. The proximity sensor 141 is the sensor that detects a presence or absence of an object approaching a prescribed detecting surface or an object existing around the proximity sensor using an electromagnetic field strength or infrared ray without mechanical contact. Hence, the proximity sensor has longer durability and also has wider utility than a contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touch screen includes the electrostatic capacity proximity sensor, it is configured to detect the proximity of a pointer using a variation of electric field according to the proximity of the pointer. In this arrangement, the touch screen (touch sensor) can be classified as the proximity sensor.

In the following description, for clarity, an action that a pointer approaches without contacting the touch screen while being recognized as located on the touch screen is named 'proximity touch'. And, an action that a pointer actually touches the touch screen is referred to as a 'contact touch'. The meaning of the position on the touch screen proximity-touched by the pointer means the position of the pointer which vertically opposes the touch screen when the pointer performs the proximity touch.

The proximity sensor detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be output to the touch screen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output as synthesized together or can be output in sequence. The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hot/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. The projector module 155 is able to display an image, which is identical to or partially different at least from the image displayed on the display 151, on an external screen or wall according to a control signal of the controller 180. The projector module 155 can include a light source to generating light (e.g., laser) for projecting an image externally, an image producing means for producing an image to output externally using the light generated from the light source, and a lens for enlarging to output the image externally in a predetermined focus distance. The projector module 155 can further include a device for adjusting an image projection direction by mechanically moving the lens or the whole module.

The projector module 155 can be classified into a cathode ray tube (CRT) module, a liquid crystal display (LCD) module, a digital light processing (DLP) module, or the like according to a device type of a display means. In particular, the DLP module is operated by the mechanism of enabling the light generated from the light source to reflect on a digital micro-mirror device (DMD) chip and can be advantageous for the downsizing of the projector module 151.

The projector module 155 can be provided in a length direction of a lateral, front or backside direction of the mobile terminal 100. And, it is understood that the projector module 155 can be provided on any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound output in case of a touch input to the touch screen can be stored in the memory unit 160.

Moreover, 2D images and 3D images may be stored in the memory 160. In this case, the 2D images may include left or right eye images for the 3D images or may have no relation with the 3D images. The 3D images may be obtained from outside via the wireless communication unit 110. The 3D images may be stored in the memory 160 in advance. The 3D images may be generated using left eye images input via the $1^{st}$ camera 121a and right eye images input via the $2^{nd}$ camera 121b. The memory 160 may store the 2D images and the 3D image separately under the control of the controller 180.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. The mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touch screen as characters or images, respectively.

Meanwhile, a camera moving unit 182 is provided between the first and second cameras 121a and 121b for 3D image photographing and adjusts a gap or space between the first and second cameras 121a and 121b by moving the first and second cameras 121a and 121b with reference to a middle point between the first and second cameras 121a and 121b.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective view of a mobile terminal according to one embodiment of the present invention. While the mobile terminal 100 is shown as a bar type terminal, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) defining an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like.

A display 151, an audio output unit 152, a camera 121, user input units 130/131 and 132, a microphone 122, an interface 180 and the like can be provided in the terminal body, and more particularly, at the front case 101. As shown, the display 151 occupies most of a main face of the front case 101. The audio output unit 151 and the camera 121C are provided to an area adjacent to one end portion of the display 151, while the user input unit 131 and the microphone 122 are provided at an area adjacent to the other end portion of the display 151. The user input unit 132 and the interface 170 can be provided at lateral sides of the front and rear cases 101 and 102.

The input unit 130 is manipulated to receive a command for controlling an operation of the terminal 100. The input unit 130 may include a plurality of manipulating units 131 and 132. The manipulating units 131 and 132 can be referred to as a manipulating portion and may adopt any mechanism enabling a user to perform a manipulation action by experiencing a tactile feeling. Content input by the first or second manipulating unit 131 or 132 can be diversely set. For instance, such a command as start, end, scroll and the like may be input by the first manipulating unit 131 and a command for a volume adjustment of sound output from the audio output unit 152, a command for a switching to a touch recognizing mode of the display 151 or the like can be input by the second manipulating unit 132.

FIG. 2B is a perspective view of a backside of the terminal shown in FIG. 2A. Referring to FIG. 2B, a first camera 121a and a second camera 121b for 3D image photography can be additionally provided at the backside of the terminal body, and more particularly, to the rear case 102. In particular, the first and second cameras 121a and 121b are arranged on a straight line within a range not to exceed a typical user's eye distance (e.g., 6.0-6.5 cm). And, a rail 183 enabling the first and second cameras 121a and 121b to move thereon is located between the first and second cameras 121a and 121b. Thus, the first and second cameras 121a and 121b can move towards and away from each other via the rail 183 under the control of a camera moving unit 182.

In this configuration, the first and second cameras 121a and 121b enable a normal 2D image photographing as well as the 3D image function. Moreover, a mirror and flash can be further provided around the first and second cameras 121a and 121b. The flash projects light toward a subject in case of photographing the subject using the first and second cameras 121a and 121b. In case that a user attempts to take a picture of himself (self-photographing) using the first and second cameras 121a and 121b, the mirror enables the user to view his face reflected by the mirror. Meanwhile, each of the first and second cameras 121a and 121b has a photographing direction substantially opposite that of the third camera 121c and may have pixels identical to or different from those of the third camera 121c. For instance, the third camera 121c may have low pixels to be sufficient to photograph and transmit a picture of user's face for a video call and the like, while each of the first and second cameras 121a and 121b has high pixels for photographing a general subject that is not intended to be sent instantly.

An additional audio output unit 152' can be provided at the backside of the terminal body. The additional audio output unit 152' is able to implement a stereo function together with the front audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 for supplying power to the terminal 100 is provided to the terminal body, and the power supply unit 190 can be configured to be built within the terminal body. Alternatively, the power supply unit 190 can be configured to be detachably connected to the terminal body.

In the following description, a method of controlling a 3D image in a mobile terminal applicable to embodiments of the present invention will be explained. Stereoscopic images implemented on the display unit 151 of the mobile terminal 100 according to the present invention can be mainly classified into two kinds of categories, monoscopic and stereoscopic.

The first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a 3D image can substantially include a planar image (2D image).

The second category is a stereoscopic scheme of providing different images to both eyes, respectively, which uses the principle that a user can sense a stereoscopic effect in looking at an object with human eyes. In particular, human eyes see different planar images when looking at the same object due to a distance between both eyes. These different images are provided to the human brain via the retinas. The human brain is able to sense depth and reality of a 3D image by combining the different images together. Therefore, the binocular disparity attributed to the distance between both of the eyes enables the user to sense the stereoscopic effect despite an individual difference of the binocular disparity. Accordingly, binocular disparity becomes an important factor of the second category.

Figure 3:
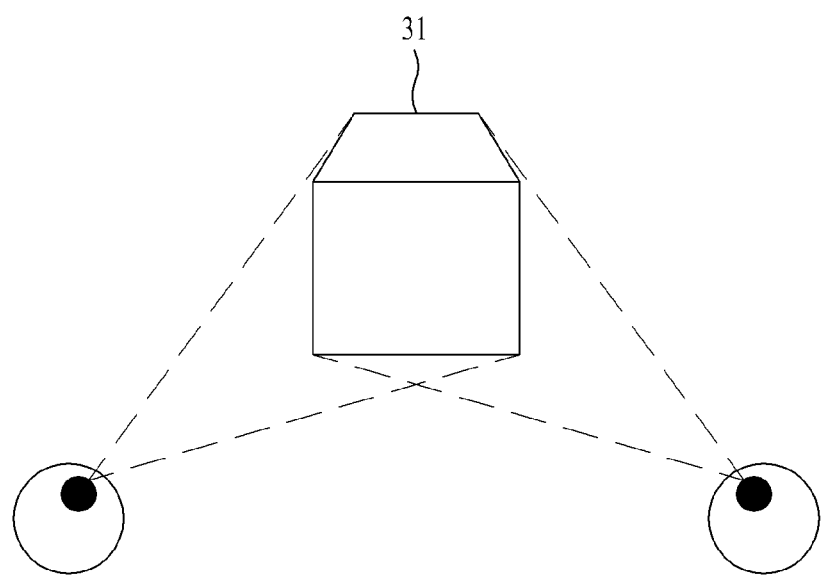
FIG. 3 is a diagram for explaining the principle of binocular disparity.
Figure 3:
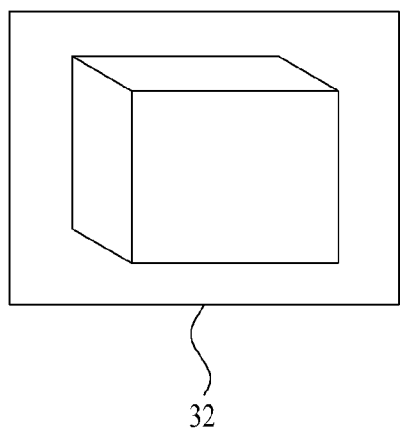
Figure 3:
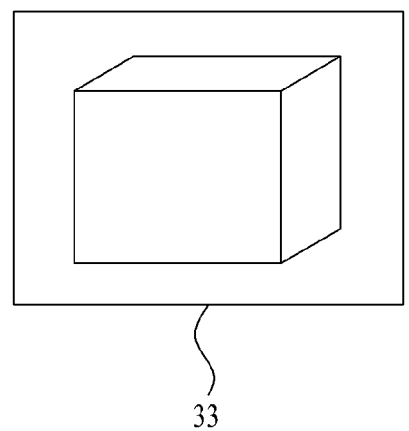

The binocular disparity is explained in detail with reference to FIG. 3. Referring to FIG. 3, assume a situation that a hexahedron 31 is positioned as a subject in front of and below an eye's height to be seen through human eyes. In this case, the left eye is able to see a left-eye planar image 32 revealing three facets including a top side, a front side and a left lateral side of the hexahedron 31 only and the right eye is able to see a right-eye planar image 33 revealing three facets including the top side, the front side and a right lateral side of the hexahedron 31 only. Even if a real thing is not actually positioned in front of both eyes of a user, if the left-eye planar image 32 and the right-eye planar image 33 are set to arrive at the left eye and the right eye, respectively, a user is able to substantially sense the hexahedron 31 as if looking at the actual hexahedron 31.

Thus, in order to implement the 3D image belonging to the second category in the mobile terminal 100, images of the same object should arrive at both eyes as discriminated from each other for the left and right-eye images of the same object with a predetermined parallax.

Figure 4:
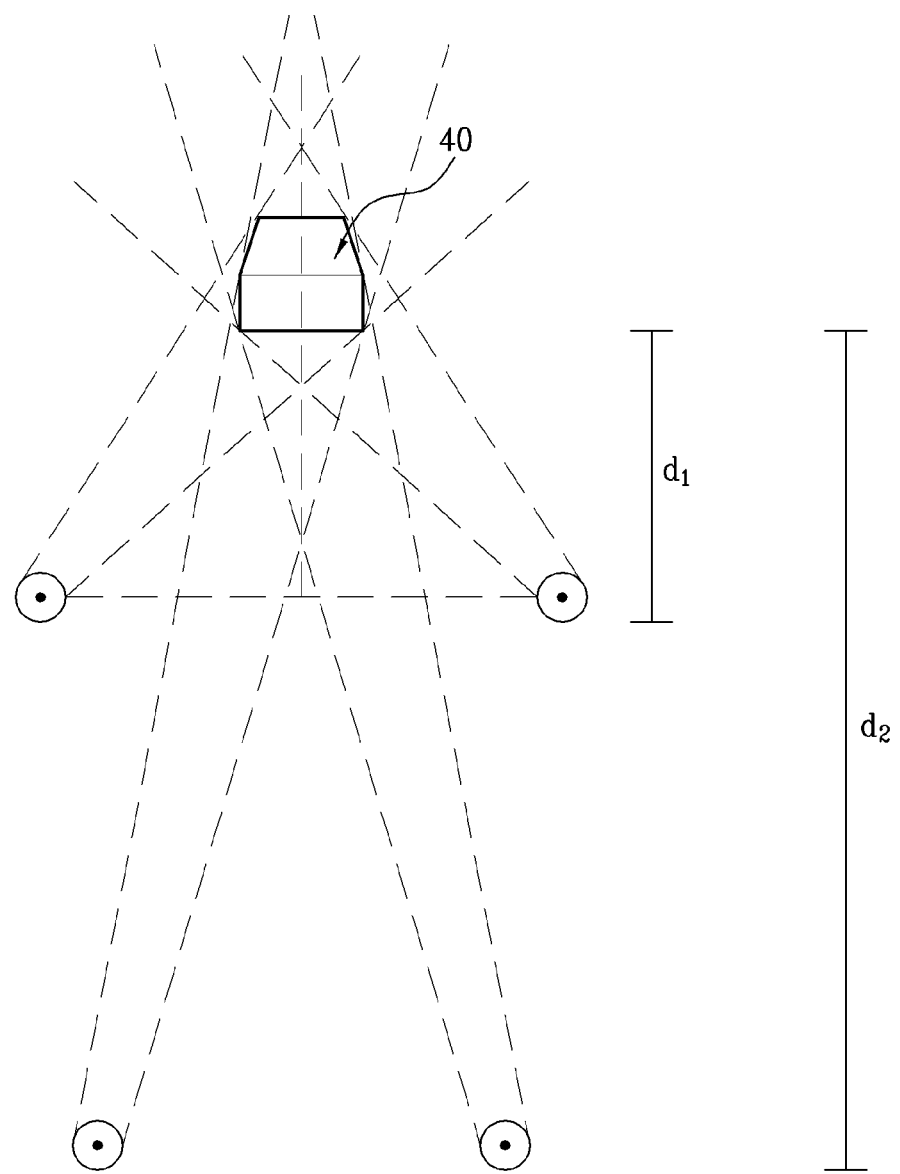
FIG. 4 is a diagram for illustrating the concept of a sense of distance and 3D depth attributed to binocular disparity.

In the following description, 3D depth attributed to the binocular disparity (parallax) is explained with reference to FIG. 4. Referring to FIG. 4, a lateral side ratio of an image entering each eye in view of a hexahedron 40 of a distance d1 trough both eyes is relatively higher than that at a distance d2, whereby a difference between images seen through both eyes increases. Moreover, an extent of a stereoscopic effect sensed by a user in view of the hexahedron 40 at the distance d1 is greater than the hexahedron 40 at the distance d2. In particular, when a thing is seen through both eyes of a user, a closer subject gives a greater stereoscopic effect, whereas a farther subject gives a smaller stereoscopic effect. Such a difference in stereoscopic effect can be digitized into a 3D depth or a 3D level.

As mentioned in the following description, in order to implement a 3D stereoscopic image, an image for a right eye and an image for a left eye need to arrive at both eyes as discriminated from each other. For this, various methods are possible as set forth below.

1) Parallax Barrier Scheme

Figure 5:
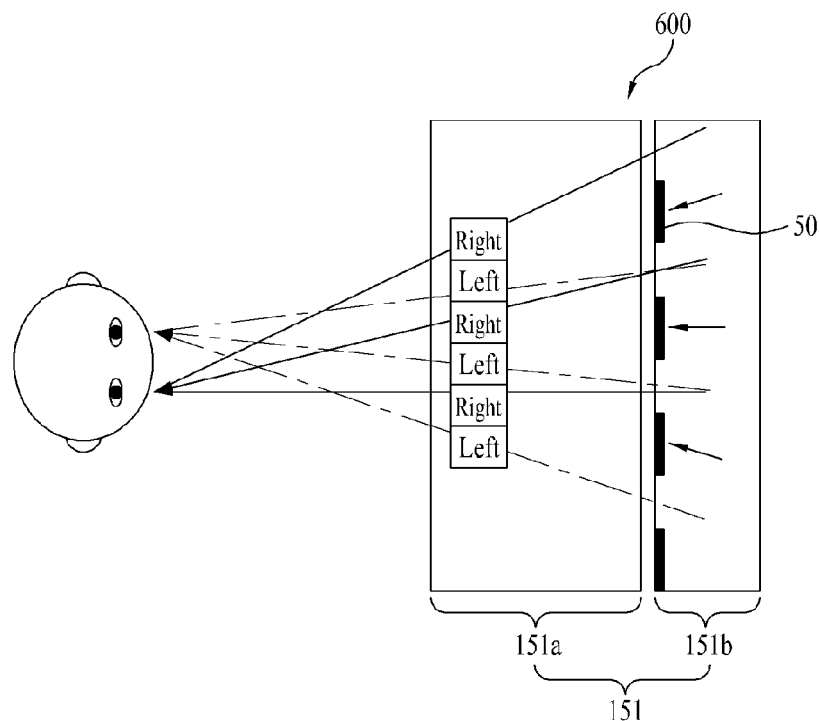
FIG. 5 includes diagrams (a) and (b) illustrating a scheme of implementing a 3D stereoscopic image in a display unit of a parallax barrier type applicable to embodiments of the present invention.
Figure 5:
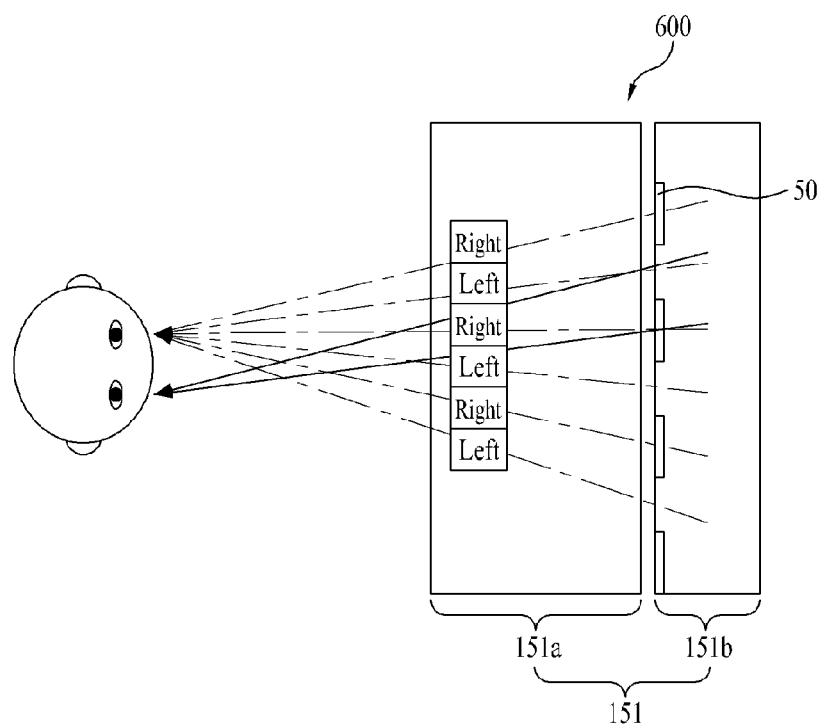

The parallax barrier scheme enables different images to arrive at both eyes in a manner of controlling a propagating direction of light by electronically driving a cutoff device provided between a general display and both eyes, as shown in FIG. 5. Referring to FIG. 5, a structure of a parallax barrier type display unit 151 for displaying a 3D image can be configured in a manner that a general display device 151a is combined with a switch LC (liquid crystals) 151b. A propagating direction of light is controlled by activating an optical parallax barrier 600, as shown in FIG. 5(a), using the switch LC 151b, whereby the light is separated into two different lights to arrive at left and right eyes, respectively. Thus, when an image generated from combining an image for the right eye and an image for the left eye together is displayed on the display device 151a, a user sees the images for the corresponding eye, respectively, thereby providing the 3D or stereoscopic effect.

Alternatively, when the parallax barrier 600 attributed to the switch LC is electrically controlled to enable entire light to be transmitted therethrough, as shown in FIG. 5(b), the light separation due to the parallax barrier is avoided. Therefore, the same image can be seen through the left and right eyes. In this case, the function of a conventional display unit is available.

While the parallax barrier scheme has been described as performing parallel translation in one axial direction, the present invention is not limited to just this arrangement. The present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a similar to that of the polarized glasses scheme. In particular, a right-eye image and a left-eye image are alternately displayed on a display unit with prescribed periodicity. While the left-eye image is being displayed, a shutter of the right eye is closed to enable the left-eye image to arrive at the left eye only. While the right-eye image is being displayed, a shutter of the left eye is closed to enable the right-eye image to arrive at the right eye only.

A mobile terminal according to the exemplary embodiments of the present invention is able to provide a user with a 3D stereoscopic image via the display unit 151 by at least any one of the above described methods.

Because the 3D image principle described with reference to FIG. 4 and FIG. 5 assumes a stereoscopic object, the object in a left-eye image differs from the object in a right-eye image in shape. Yet, if an object is not a stereoscopic object but a planar object, a shape of the object in a left-eye image is identical to that of the object in a right-eye image. If a position of the object in the left-eye image is different from that of the object in the right-eye image, a user is able to perceive a perspective view. For purposes of the present application, the description will be based on the assumption that the stereoscopic image in the following description is a planar object. Of course, it is apparent to those skilled in the art that the present invention is applicable to stereoscopic objects as well.

In the following description, a process for displaying 2D image and 3D images according to the present invention may be explained in detail with reference to the accompanying drawings.

Figure 6:
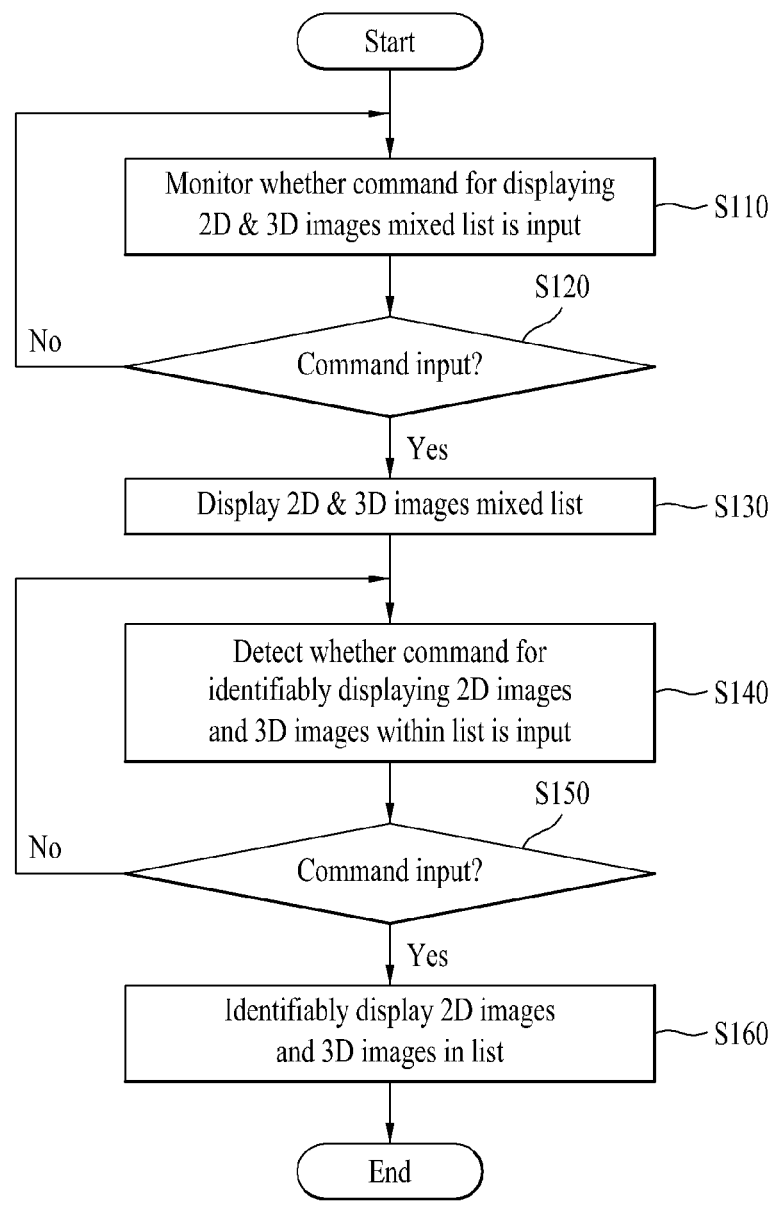
FIG. 6 is a flowchart of a process for displaying 2D images and 3D images in a mobile terminal according to the present invention.

FIG. 6 is a flowchart of a process for displaying 2D images and 3D images in a mobile terminal according to the present invention.

Referring to FIG. 6, the controller 180 of the mobile terminal 100 may detect whether a command for displaying a list having 2D and 3D images mixed together therein is input via the user input unit 130 or the touchscreen 151 [S110].

In this case, the 2D and 3D images may include the images stored in the memory 160. When such a menu function related to an image display as 'camera album', 'photo album', 'video album', 'image viewer', 'gallery' and the like is activated, the 2D and 3D images may be displayed.

In particular, if a specific menu is selected from the menu functions related to the image display, the controller 180 may recognize the specific menu selected status as the input of the command for displaying the list and may then display the list having the 2D and 3D image mixed therein on an active screen of the selected menu.

As mentioned in the foregoing description, if the command for the list display is input [S120], the controller 180 may display the list on the screen [S130]. In doing so, the controller 180 may display the list having the 2D and 3D image mixed therein as thumbnails.

Subsequently, while the list is displayed, the controller 180 may detect whether a command for displaying the 2D images and the 3D image identifiably in the list is input [S140]. If the identifiable display command is input, [S150], the controller 180 may control the 2D images and the 3D images to be displayed as identifiable from each other [S160].

In doing so, the command in the step S140 and the step S150 may include a signal indicating a corresponding display mode when the display unit 151 is a 2D display mode or a 3D display mode.

In particular, if a current display mode is the 2D/3D display mode, the display unit 151 may transmit a signal indicating the 2D/3D mode to the controller 180.

The controller 180 may then recognizes the 2D/3D display mode indicating signal received from the display unit 151 as the command in the step S140 and the step S150.

In accordance with the 2D or 3D display mode of the display unit 151, the controller 180 may be able to display the 2D images and the 3D images in a manner that the 2D images and the 3D images are identifiable from each other in the list.

In particular, if the display unit 151 is in the 2D display mode, the controller 180 may be able to display the 2D images and the 3D images in a manner of giving greater emphasis to the 2D images in the list. If the display unit 151 is in the 3D display mode, the controller 180 may be able to display the 2D images and the 3D images in a manner of giving greater emphasis to the 3D images in the list.

Namely, before a user selects to view one of the 2D images and the 3D images in the list, images having dimensions corresponding to a current display mode of the display unit 151 may be displayed and viewed by a user in a manner having a greater emphasis on the corresponding image in the list. Therefore, the user may be led to select and view an image having the dimensions suitable for the current display mode of the display unit 151.

In accordance with a display mode of the display unit 151, details for identifiably displaying the 2D images and the 3D images in the list shall be described with reference to FIGS. 7 to 19.

Meanwhile, the command in the step S140 and S150 may include a signal generated in accordance with user manipulation of the touchscreen 151 or the user input unit 130.

Once the list is displayed, the controller 180 provides the list displayed screen with a $1^{st}$ user interface (hereinafter named UI) for setting the display mode of the display unit 151 to 2D or 3D. If the display mode of the display unit 151 is set via the $1^{st}$ UI, the controller 180 may be able to display the images having the same dimensions of the set display mode with greater emphasis to the corresponding images in the list over images having different dimensions.

Details of identifiably displaying the 2D images and the 3D images in the list using the $1^{st}$ UI shall be described later with reference to FIGS. 20 to 22.

Once the list is displayed, the controller 180 provides the list displayed screen with a $2^{nd}$ user interface for setting 2D or 3D. If either 2D or 3D is set via the $2^{nd}$ UI, the controller 180 may be able to display the images having the set dimensions with greater emphasis to the corresponding images in the list over images having different dimensions.

Details of identifiably displaying the 2D images and the 3D images in the list using the $2^{nd}$ UI shall be described later with reference to FIGS. 23 to 25.

If a touch gesture corresponding to prescribed dimensions (e.g., 2D, 3D) is input to the list displayed touchscreen 151, the controller 180 may be able to display the images having the set dimensions matching the input touch gesture with greater emphasis to the corresponding images in the list over images having different dimensions.

Details of identifiably displaying the 2D images and the 3D images in the list using the touch gesture shall be described later with reference to FIGS. 26 to 28.

$1^{st}$ Embodiment

A $1^{st}$ embodiment of the present invention relates to a following process. First of all, if a command for displaying a list having the 2D images and the 3D images mixed therein is input, a current display mode (e.g., 2D, 3D) of the display unit 151 may be obtained before displaying the list. And, images having the same dimensions of the obtained display mode of the display unit 151 may be displayed with greater emphasis to the corresponding images over other images having different dimensions.

Figure 7:
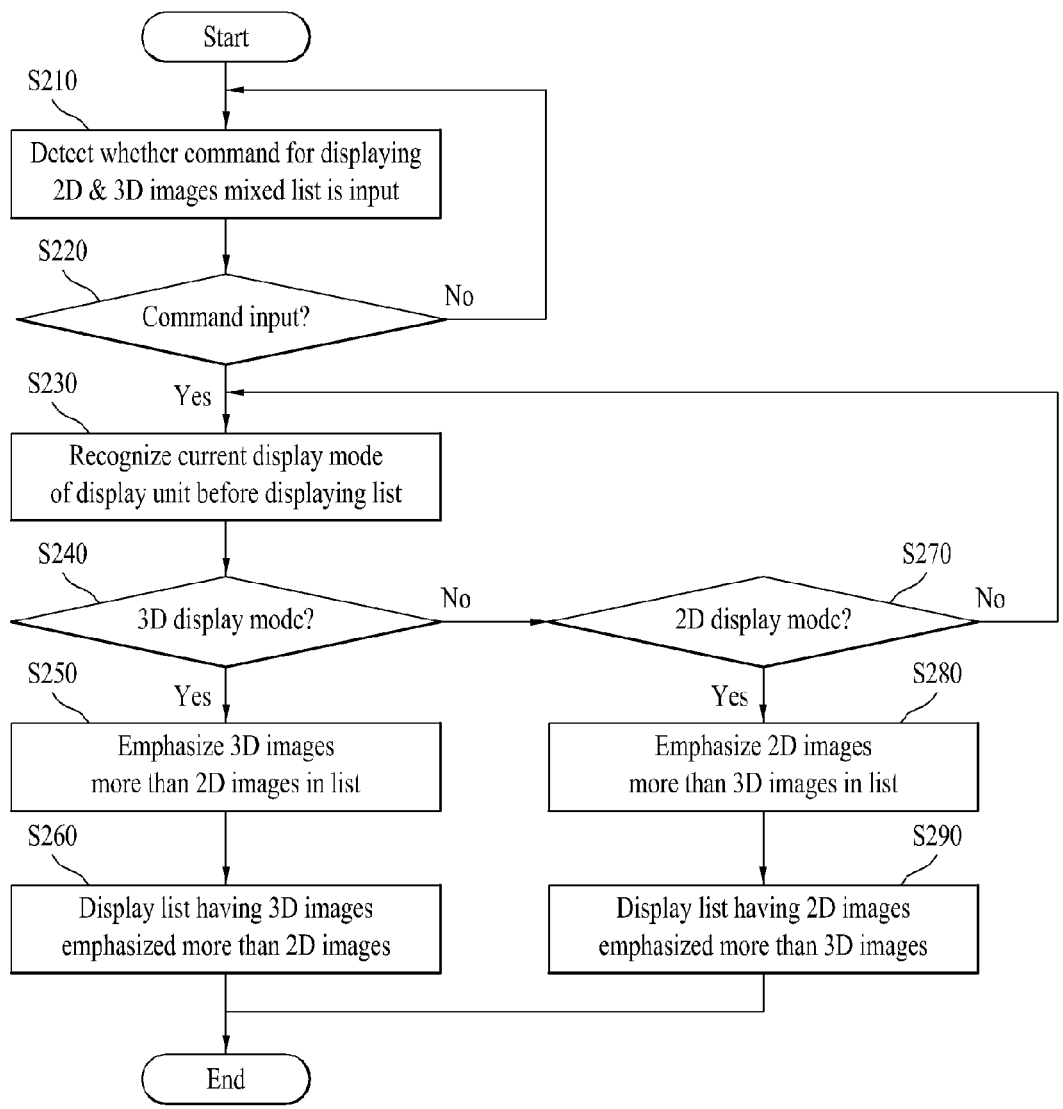
FIG. 7 is a flowchart of a process for identifiably displaying 2D images and 3D images in a list having the 2D and 3D images mixed together therein in accordance with a 2D or 3D display mode of a display unit according to a first embodiment of the present invention.

FIG. 7 is a flowchart of a process for identifiably displaying 2D images and 3D images in a list having the 2D and 3D images mixed together therein in accordance with a 2D or 3D display mode of a display unit according to a 1$^{st}$ embodiment of the present invention.

FIGS. 8 to 19 depict screen configurations of a process for identifiably displaying 2D images and 3D images in a list having the 2D and 3D images mixed together in accordance with a 2D or 3D display mode of a display unit according to a 1$^{st}$ embodiment of the present invention.

Referring to FIGS. 7 to 19, the controller 180 may detect whether a display command for displaying a list 300 in which 2D images 311 to 313 and 3D images 321 to 323 are mixed together [S210]. If the display command for displaying the list 300 is input [S220], the controller 180 may ascertain whether the display unit 151 is currently in a 2D display mode or a 3D display mode before displaying the list 300 [S230].

If the display unit 151 is currently in the 3D display mode [S240], the controller 180 may control the 3D images 321 to 323 to be more emphasized than the 2D images 311 to 313 [S250] and may display the list 300_3D in which the 3D images 321 to 323 are emphasized [S260] in order to enable the 3D images 321 to 323 to be well identifiable in the list 300.

Alternatively, if the display unit 151 is currently in the 2D display mode [S270], the controller 180 may control the 2D images 311 to 313 to be more emphasized than the 3D images 321 to 323 [S280] and may display the list 300_2D in which the 2D images 311 to 313 are emphasized [S290] in order to enable the 2D images 311 to 313 to be well identifiable in the list 300.

In particular, the controller 180 may control the images having the same dimensions of the display mode (e.g., 2D, 3D) of the display unit 151 to be emphasized in the list 300 in a manner that the images having the same dimensions of the display mode (e.g., 2D, 3D) of the display unit 151 differ from the rest of the images having different dimensions in display style within the list 300.

In the following description, a process for emphasizing and displaying the 2D images 311 to 313 or the 3D images 321 to 323 in the list 300 in accordance with the 2D or 3D display mode of the display unit 151 will be explained in detail with reference to FIGS. 8 to 19.

Figure 8:
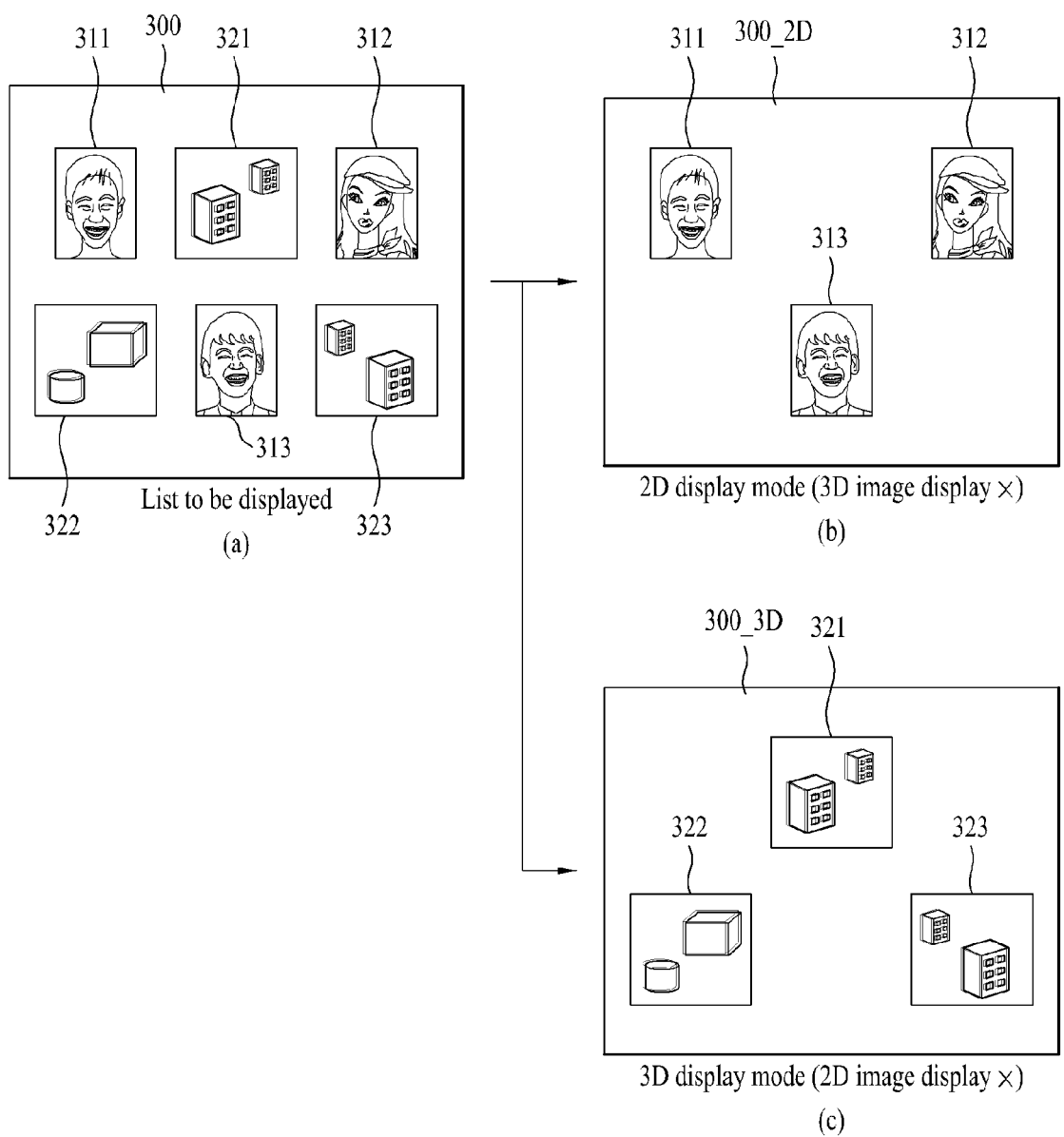
FIG. 8 is a diagram of screen configurations of a process for displaying images having the same dimensions of a display mode of the display unit in the list in accordance with a display command.

FIG. 8 shows a process for displaying images (e.g., 2D images, 3D images) having the same dimensions of a display mode (e.g., 2D, 3D) of the display unit in the list 300.

In particular, FIG. 8 (a) virtually shows a list 300, which is to be displayed in accordance with the display command in the step S220, despite not being displayed on the display unit 151.

If the display command for displaying the list 300 in the step S220 is input, the controller 180 checks a current display mode of the display unit 151 before displaying the list 300 shown in FIG. 8 (a).

If the current display mode of the display unit 151 is 2D, referring to FIG. 8 (b), the controller 180 may display a list 300_2D, from which the 3D images 321 to 323 are removed, to emphasize the 2D images 311 to 313 within the list 300_2D.

On the other hand, if the current display mode of the display unit 151 is 3D, referring to FIG. 8 (c), the controller 180 may display a list 300_3D, from which the 2D images 311 to 313 are removed, to emphasize the 3D images 321 to 323 within the list 300_3D.

Figure 9:
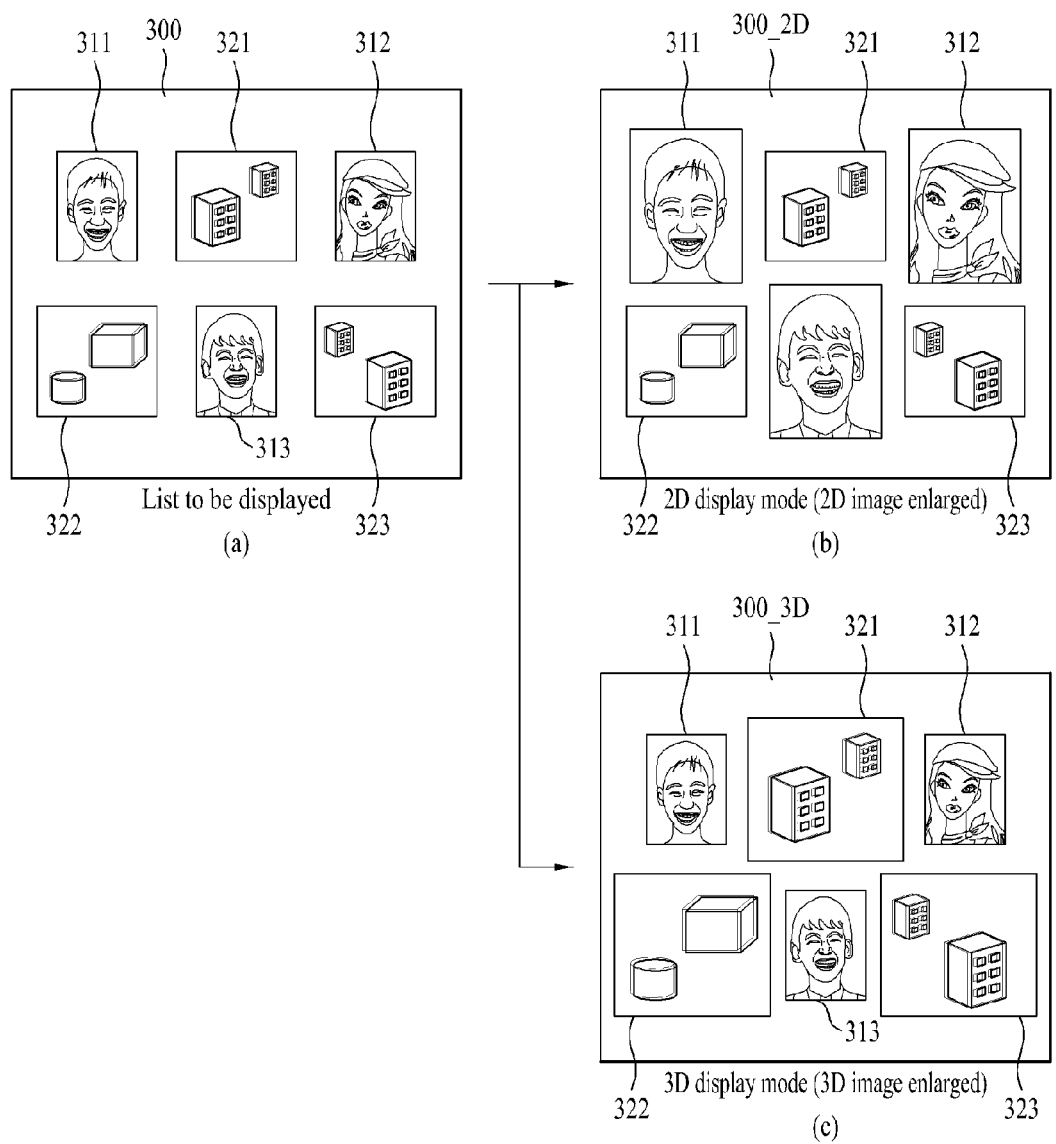
FIG. 9 is a diagram of screen configurations of a process for displaying images having the same dimensions of a display mode of the display unit within the list by emphasizing the images in a manner of displaying the corresponding images larger than other images having different dimensions within the list.

FIG. 9 shows a process for displaying images having the same dimensions of a display mode (e.g., 2D, 3D) of the display unit within the list 300 by emphasizing the images in a manner of displaying the corresponding images larger than other images having different dimensions within the list 300.

In particular, if the display mode of the display unit is 2D, referring to FIG. 9 (b), the controller 180 may increase sizes of the 2D images 311 to 313 to become greater than those of the 3D images 321 to 323 within the list 300 and may display an enlarged list 300_2D of the 2D images 311 to 313 to emphasize the 2D images within the list.

On the other hand, if the display mode of the display unit is 3D, referring to FIG. 9 (c), the controller 180 may increase sizes of the 3D images 321 to 323 to become greater than those of the 2D images 311 to 313 within the list 300 and may display an enlarged list 300_3D of the 3D images 321 to 323 to emphasize the 3D images within the list.

Figure 10:
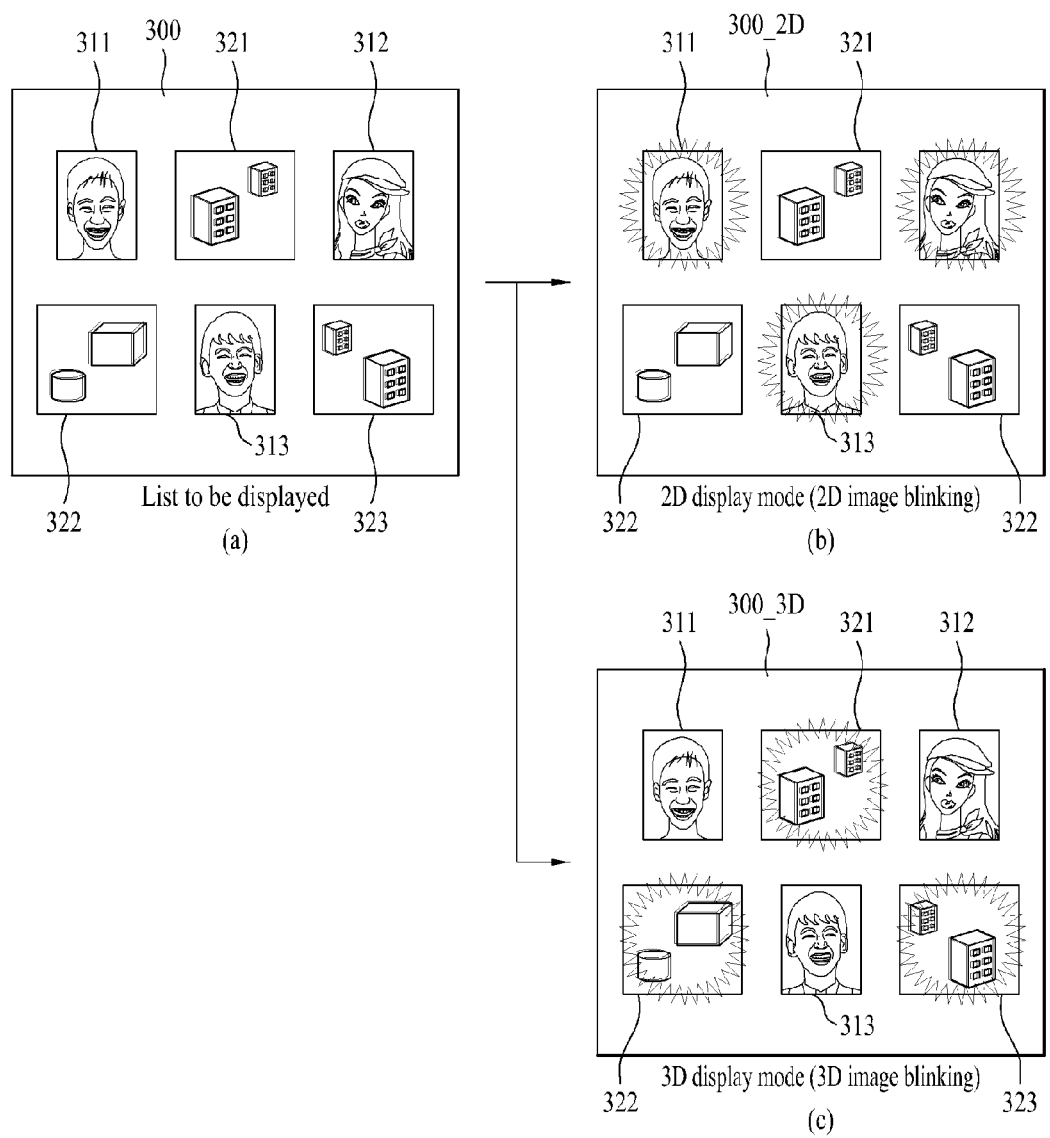
FIG. 10 is a diagram of screen configurations of a process for displaying images having the same dimensions as a display mode of the display unit within the list by emphasizing the images in a manner of blinking the corresponding images within the list.

FIG. 10 shows a process for displaying images having the same dimensions as a display mode (e.g., 2D, 3D) of the display unit within the list 300 by emphasizing the images in a manner of blinking the corresponding images within the list 300.

In particular, if the display mode of the display unit is 2D, referring to FIG. 10 (b), the controller 180 may blink and display the 2D images 311 to 313 within a list 300_2D to emphasize the 2D images 311 to 313 within the list 300_2D.

On the other hand, if the display mode of the display unit is 3D, referring to FIG. 10 (c), the controller 180 may blink and display the 3D images 321 to 323 within a list 300_3D to emphasize the 3D images 321 to 323 within the list 300_3D.

Figure 11:
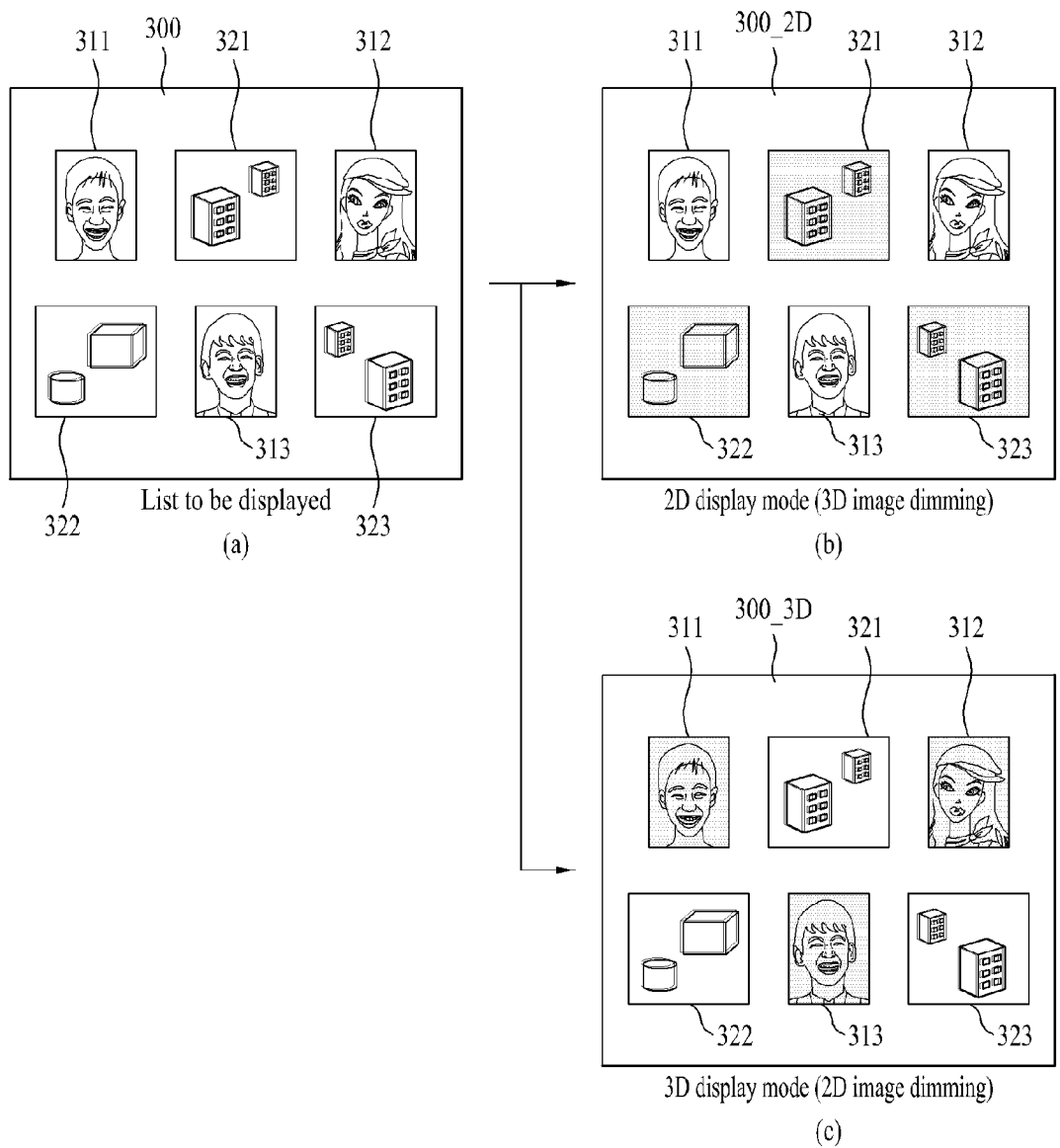
FIG. 11 is a diagram of screen configurations of a process for displaying images having the same dimensions of a display mode of the display unit within the list by emphasizing the corresponding images in a manner of displaying the corresponding images dimmer than other images within the list.

FIG. 11 shows a process for displaying images having the same dimensions of a display mode (e.g., 2D, 3D) of the display unit within the list 300 by emphasizing the corresponding images in a manner of displaying the corresponding images dimmer than other images within the list 300.

If the display mode of the display unit is 2D, referring to FIG. 11 (b), the controller 180 may display the 3D images 321 to 323 to become dimmer than the 2D images 311 to 313 within a list 300_2D to emphasize the 2D images 311 to 313 within the list 300_2D.

Particularly, if the display mode of the display unit 151 is 2D, the controller 180 may check display brightness of the 2D images 311 to 313 and display brightness of the 3D images 321 to 323 and may then display the images by overlaying the 3D images 321 to 323 with a color having brightness lower than that of the 2D images 311 to 313.

On the other hand, if the display mode of the display unit is 3D, referring to FIG. 11 (c), the controller 180 may emphasize the 3D images 321 to 323 within a list 300_3D in a manner of displaying the 2D images 311 to 313 to be dimmer than the 3D images 321 to 323 within the list 300_3D.

Figure 12:
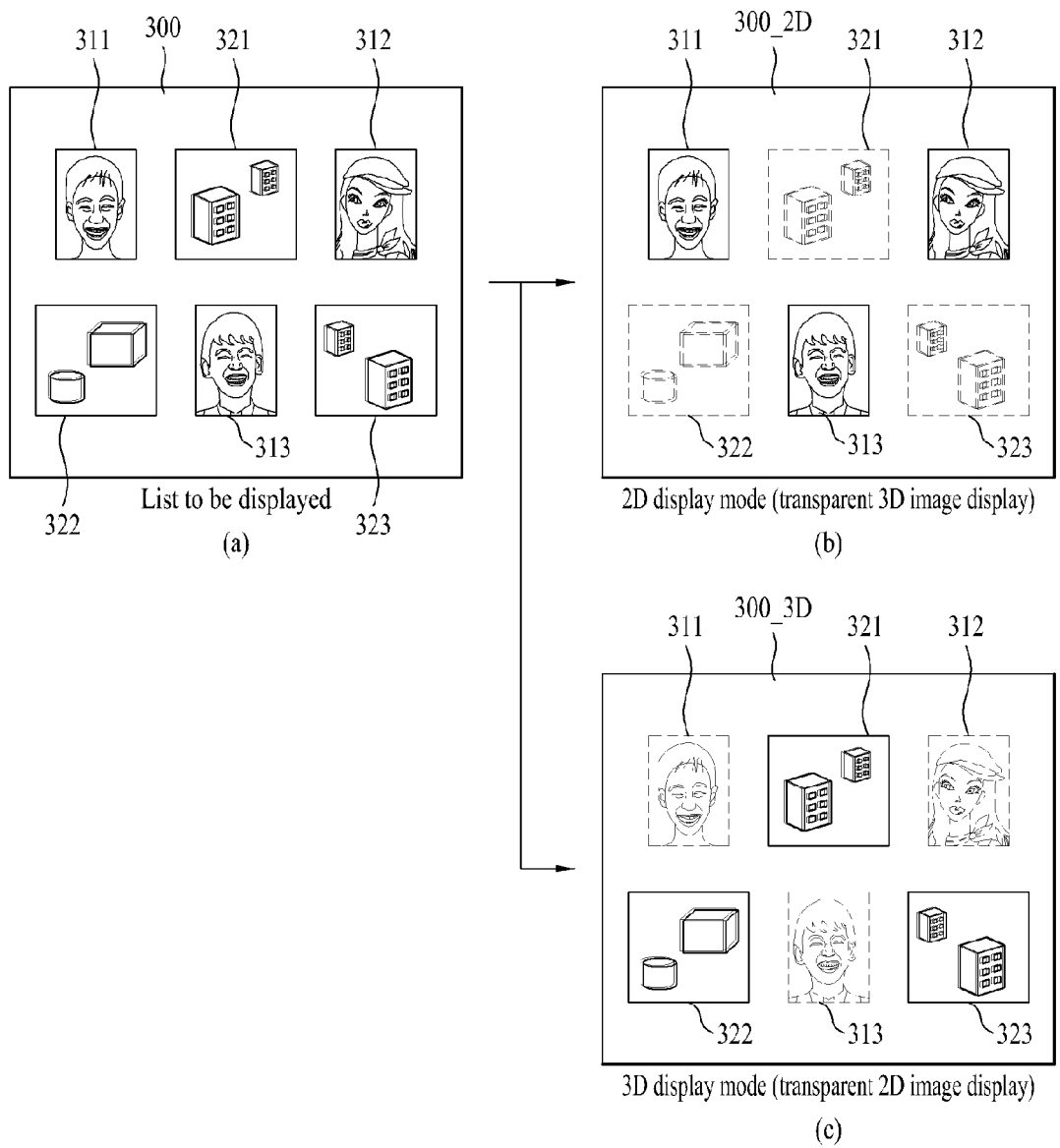
FIG. 12 is a diagram of screen configurations of a process for displaying images having the same dimensions of a display mode of the display unit within the list by emphasizing the corresponding images in a manner of displaying the corresponding images more transparent than other images within the list.

FIG. 12 shows a process for displaying images having the same dimensions of a display mode (e.g., 2D, 3D) of the display unit within the list 300 by emphasizing the corresponding images in a manner of displaying the corresponding images more transparent than other images within the list 300.

In particular, if the display mode of the display unit is 2D, referring to FIG. 12 (b), the controller 180 may display the 3D images 321 to 323 to be more transparent than the 2D images 311 to 313 within a list 300_2D to emphasize the 2D images 311 to 313 within the list 300_2D.

On the other hand, if the display mode of the display unit is 3D, referring to FIG. 12 (c), the controller 180 may emphasize the 3D images 321 to 323 within a list 300_3D in a manner of displaying the 2D images 311 to 313 to be more transparent than the 3D images 321 to 323 within the list 300_3D.

Figure 13:
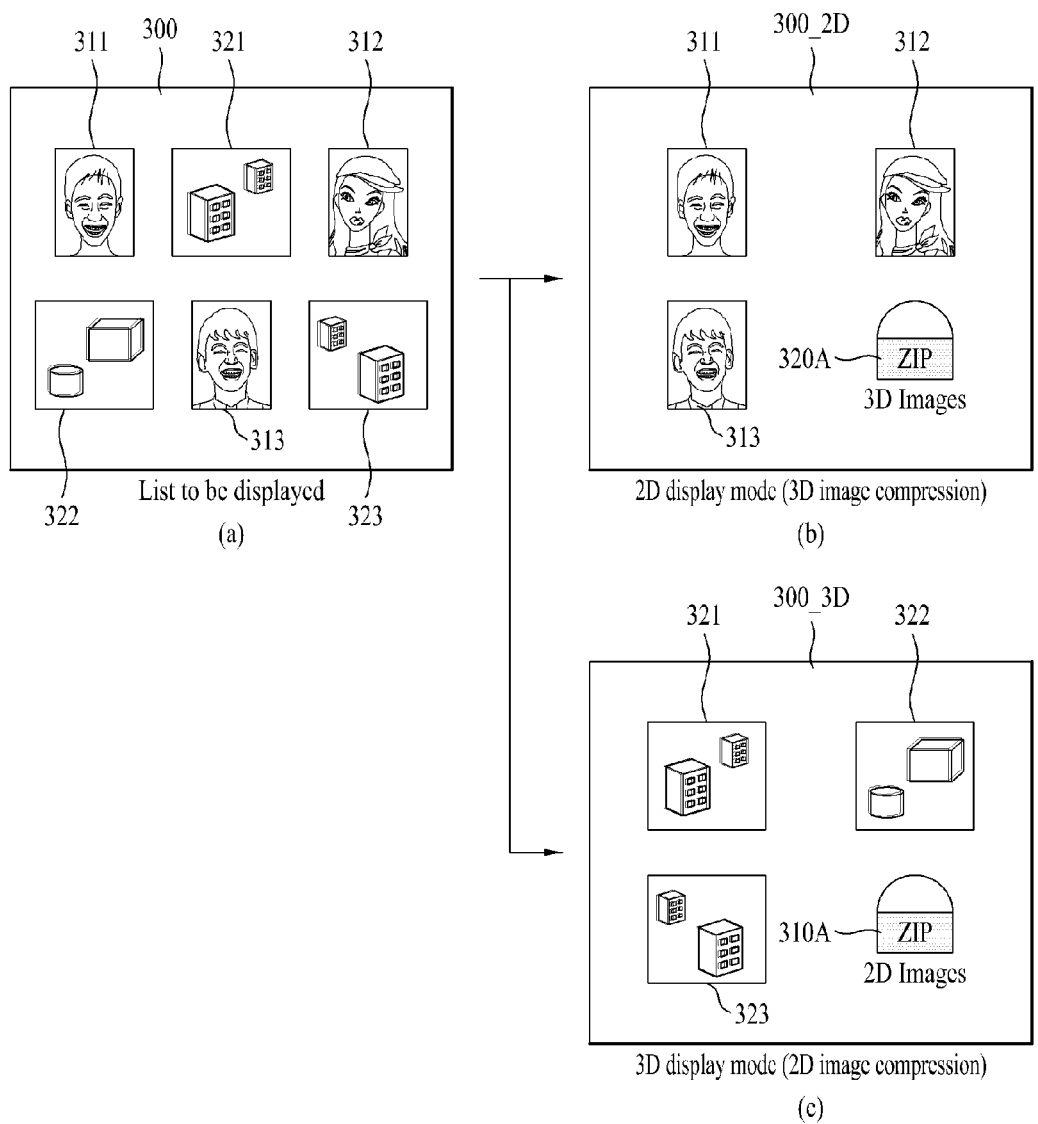
FIG. 13 is a diagram of screen configurations of a process for displaying images having the same dimensions of a display mode of the display unit within the list by emphasizing the corresponding images in a manner of displaying one integrated icon, into which other images within the list are compressed, within the list.
Figure 14:
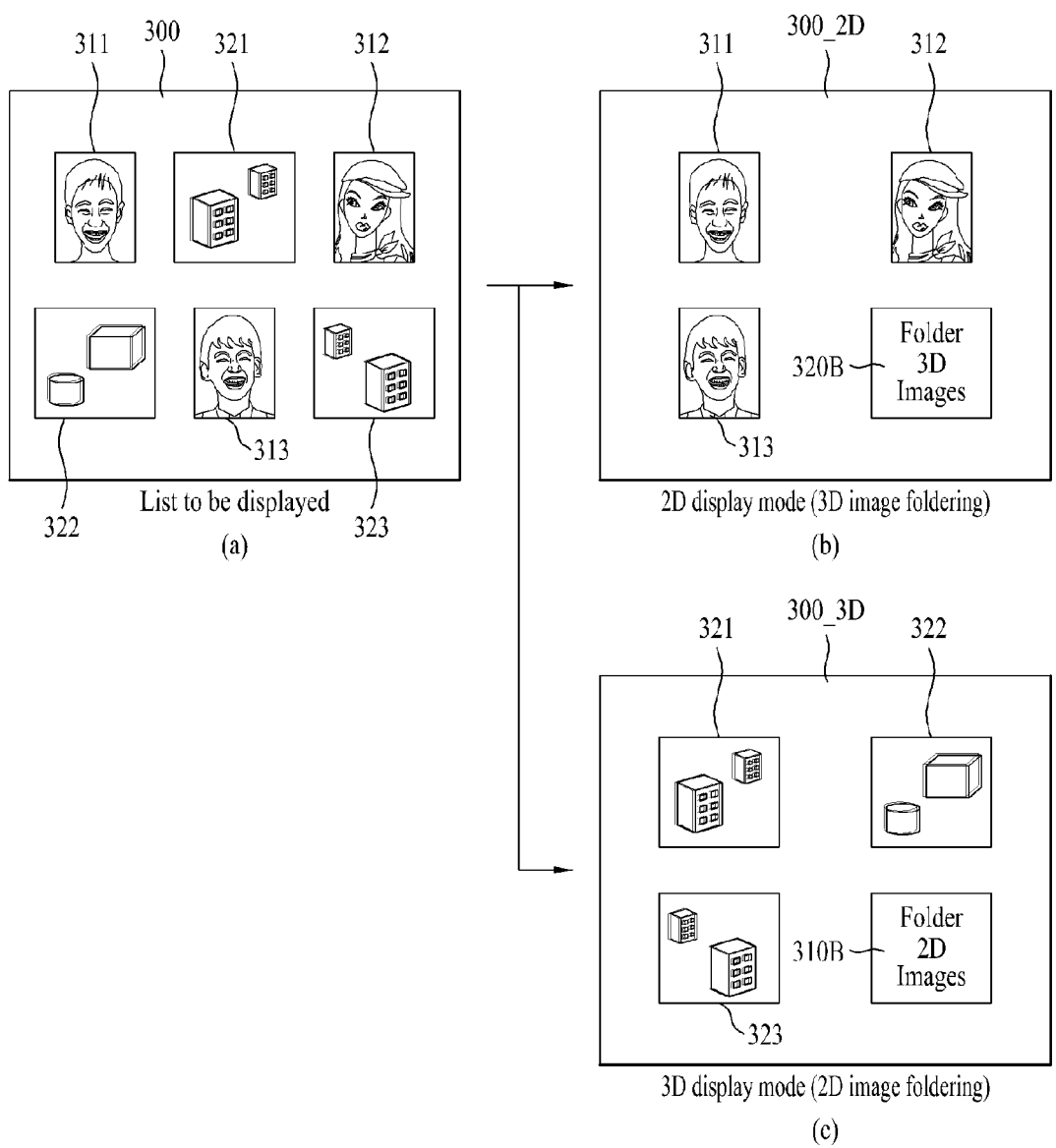
FIG. 14 is a diagram of screen configurations of a process for displaying images having the same dimensions of a display mode of the display unit within the list by emphasizing the corresponding images in a manner of displaying one integrated folder, into which other images within the list are placed, within the list.

FIG. 13 and FIG. 14 show a process for displaying images having the same dimensions of a display mode (e.g., 2D, 3D) of the display unit within the list 300 by emphasizing the corresponding images in a manner of displaying one integrated icon, into which other images within the list 300 are transformed, within the list 300.

In particular, if the display mode of the display unit is 2D, referring to FIG. 13 (b), the controller 180 may create a 1$^{st}$ icon 320A by compressing the 3D images 321 to 323 into one within a list 300_2D and may display the 1$^{st}$ icon 320A within the list 300_2D instead of the 3D images 321 to 323 to emphasize the 2D images 311 to 313 within the list 300_2D.

In this case, if the 1$^{st}$ icon 320A is selected, the 3D images 321 to 323 may be displayed again within the list 300 or may be displayed as a popup window or the like.

On the other hand, if the display mode of the display unit is 3D, referring to FIG. 13 (c), the controller 180 may create a 2$^{nd}$ icon 310A by compressing the 2D images 311 to 313 into one within a list 300_3D and may display the 2$^{nd}$ icon 310A within the list 300_3D instead of the 2D images 311 to 313 to emphasize the 3D images 321 to 323 within the list 300_3D.

Alternatively, if the display mode of the display unit is 2D, referring to FIG. 14 (b), the controller 180 may create a 1$^{st}$ folder 320B within a list 300_2D in a manner of foldering the 3D images 321 to 323 into one and may display the 1$^{st}$ folder 320B instead of the 3D images 321 to 323 to emphasize the 2D images 311 to 313 within the list 300_2D.

In this case, if the 1$^{st}$ folder 320B is selected, the 3D images 321 to 323 may be displayed again within the list 300.

On the other hand, if the display mode of the display unit is 3D, referring to FIG. 14 (c), the controller 180 may create a 2$^{nd}$ folder 310B within a list 300_3D in a manner of foldering the 2D images 311 to 313 into one and may display the 2$^{nd}$ folder 310B instead of the 2D images 311 to 313 to emphasize the 3D images 321 to 323 within the list 300_2D.

Figure 15:
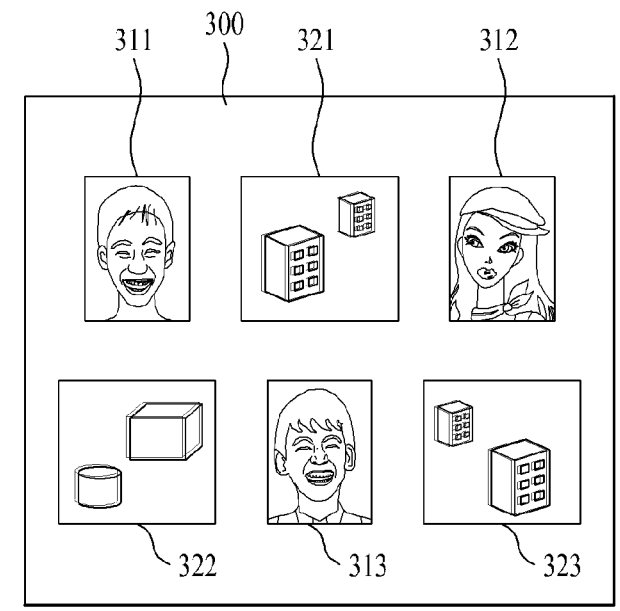
FIG. 15 is a diagram of screen configurations of a process for displaying the 2D images and the 3D images within the list separately and identifiably in a manner of sorting the 2D images and the 3D images separately within the list having the 2D images and the 3D images mixed therein.
Figure 15:
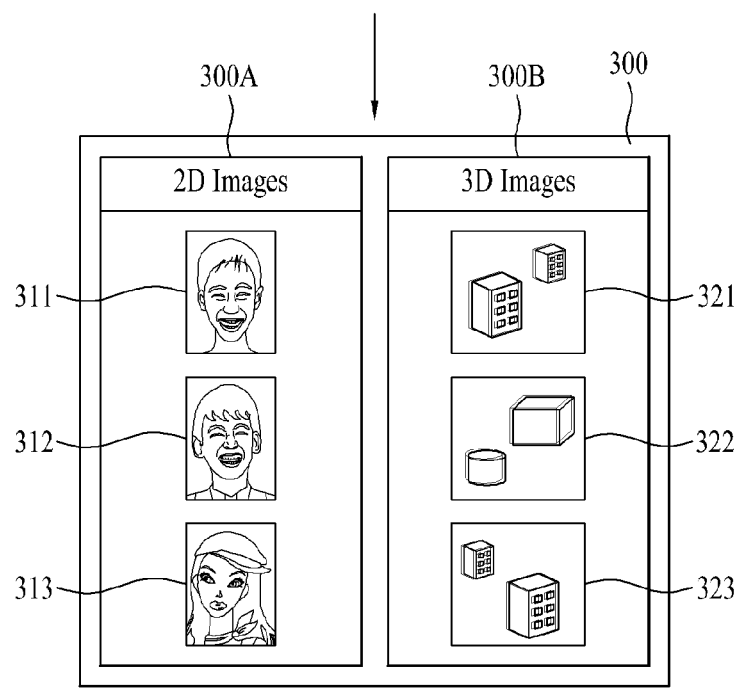

FIG. 15 shows a process for displaying the 2D images 311 to 313 and the 3D images 321 to 323 within the list 300 separately and identifiably in a manner of sorting the 2D images 311 to 313 and the 3D images 321 to 323 separately within the list 300 having the 2D images 311 to 313 and the 3D images 321 to 323 mixed therein.

In particular, referring to FIG. 15 (b), the list 300 may be separated into a 1st sublist 300A for 2D and a 2$^{nd}$ sublist 300B for 3D, may display the 2D images 311 to 313 within the 1$^{st}$ sublist 300A for 2D, and may display the 3D images 321 to 323 within the 2$^{nd}$ sublist 300B for 3D.

Figure 16:
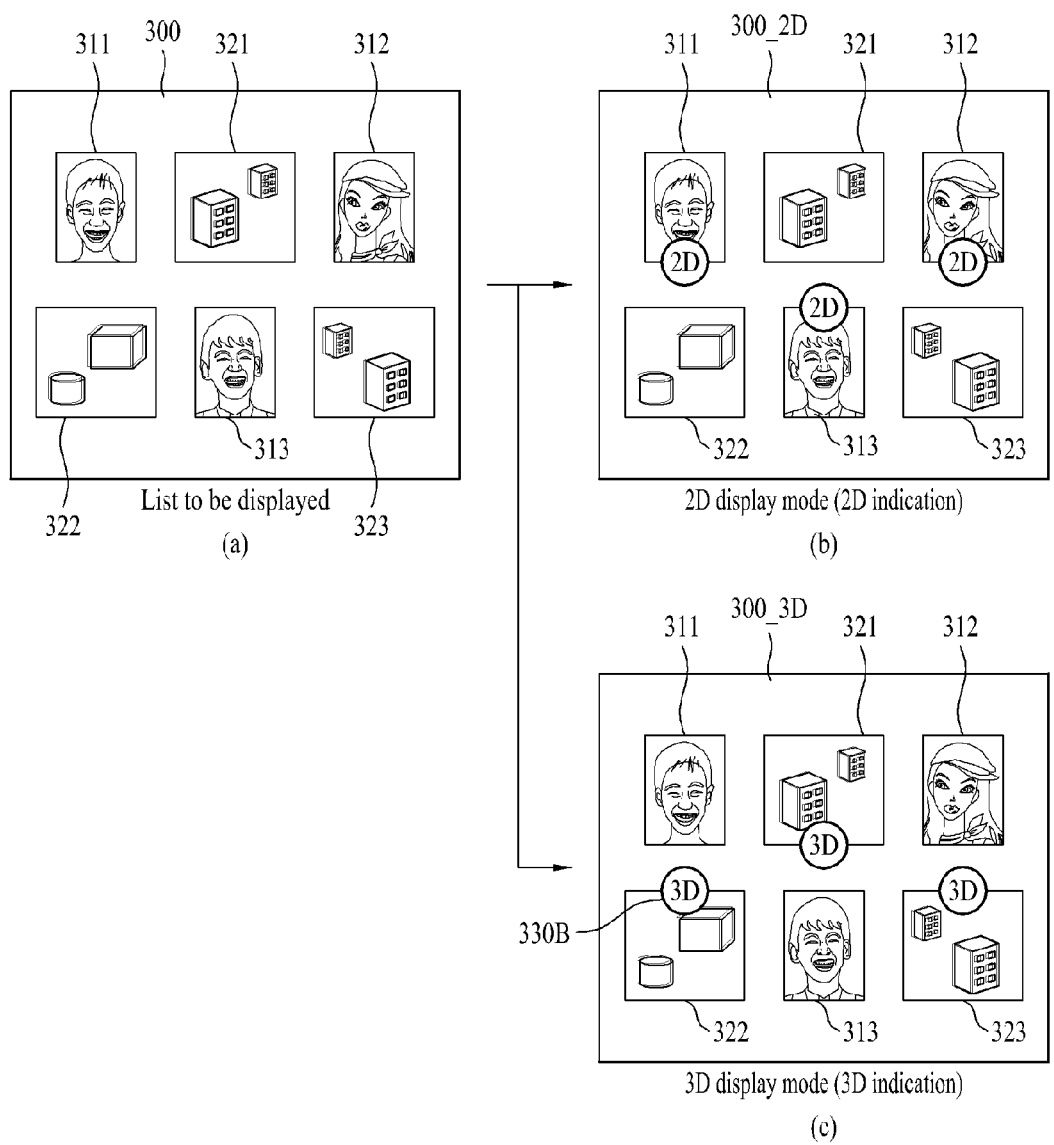
FIG. 16 is a diagram of screen configurations of a process of displaying information indicating dimensions of images having the same dimensions of the display mode of the display unit within the list.

FIG. 16 shows a process for displaying images. According to this process, a user may be informed of a current display mode of the display unit by displaying information indicating dimensions of images having the same dimensions of the display mode (e.g., 2D, 3D) of the display unit within the list 300. And, the images having the same dimensions of the display mode (e.g., 2D, 3D) of the display unit may be displayed by being emphasized within the list 300.

In particular, if the display mode of the display unit is 2D, referring to FIG. 16 (b), the controller 180 may display an information 330A indicating the 2D on each of the 2D images 311 to 313 within a list 300_2D to emphasize the 2D images 311 to 313 within the list 300_2D.

On the other hand, if the display mode of the display unit is 3D, referring to FIG. 16 (c), the controller 180 may display an information 330B indicating the 3D on each of the 3D images 321 to 323 within a list 300_3D to emphasize the 3D images 321 to 323 within the list 300_3D.

Figure 17:
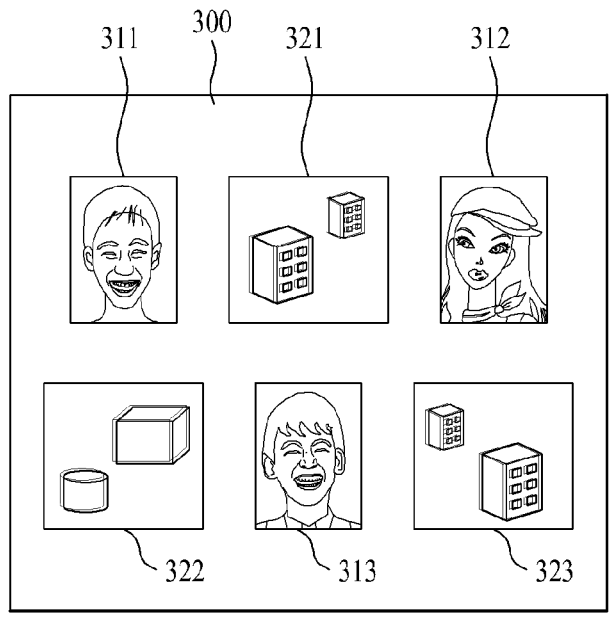
FIG. 17 is a diagram of screen configurations of a process of displaying information indicating a corresponding 3D depth level is displayed on each of the 3D images within the list.
Figure 17:
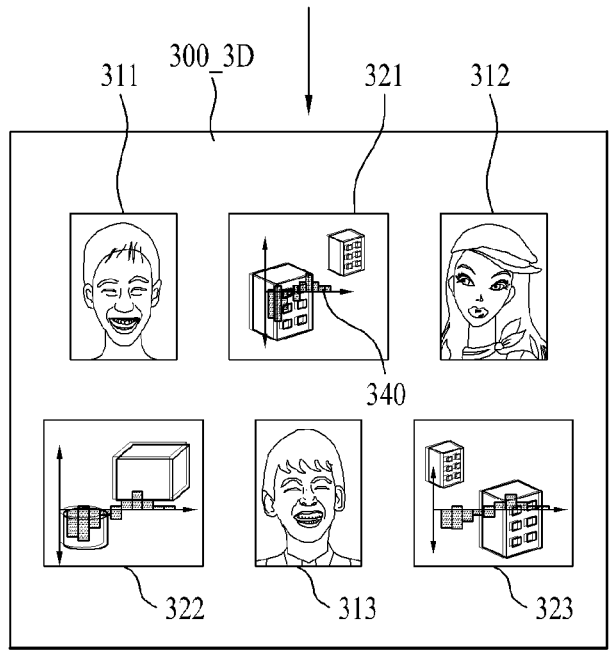

FIG. 17 shows a process for displaying images. According to this process, if a display mode of the display unit is 3D, information indicating a corresponding 3D depth level is displayed on each of the 3D images 321 to 323 within the list 300. Therefore, a user may be informed that a current display mode of the display unit is 3D. And, the user may be informed of an extent of the 3D depth level of each of the 3D images 321 to 323. Moreover, the 3D images 321 to 323 may be displayed by being emphasized within the list 300.

In particular, if the display mode of the display unit is 2D, referring to FIG. 17 (b), the controller 180 may checks the 3D depth level of each of the 3D images 321 to 323 and may display an information 340 indicating the extent of the checked 3D depth level on each of the 3D images 321 to 323.

In doing so, the information 340 indicating the extent of the 3D depth level may be displayed using a histogram.

Figure 18:
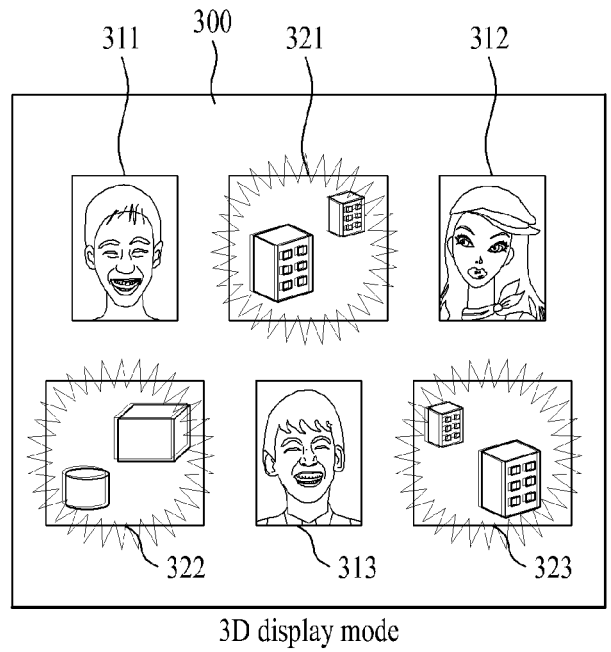
FIG. 18 is a diagram of screen configurations of a process of displaying information of a selected image that has different dimensions than those of the display mode of the display unit.
Figure 18:
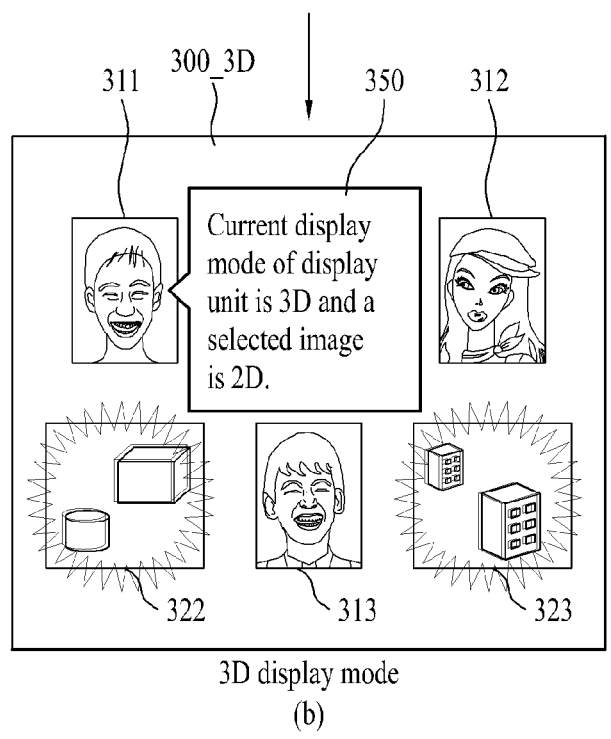

FIG. 18 shows an information displaying process. According to this process, while images having the same dimensions of a current display mode of the display unit are emphasized by one of the processes shown in FIGS. 6 to 17, if an image having dimensions different from those of the display mode is selected, information may be displayed to indicate that the selected image has different dimensions than those of the display mode of the display unit.

Referring to FIG. 18, while the 3D images 321 to 323 having the same dimensions of those of the 3D display mode of the display unit 151 by one of the processes shown in FIGS. 6 to 17 are emphasized [FIG. 18 (a)], if one 311 of the 2D images 311 to 313 is selected, the controller 180 may display information 350 indicating that the display unit 151 is currently in the 3D display mode and that the selected 2D image 311 is in 2D.

In particular, a user may read the information 350 and may be able to check the current display mode of the display unit 151 and the dimensions of the user-selected image once again using the information 350. The user may then recognize that the selected imaged is not suitable for the current display mode of the display unit 151.

Figure 19:
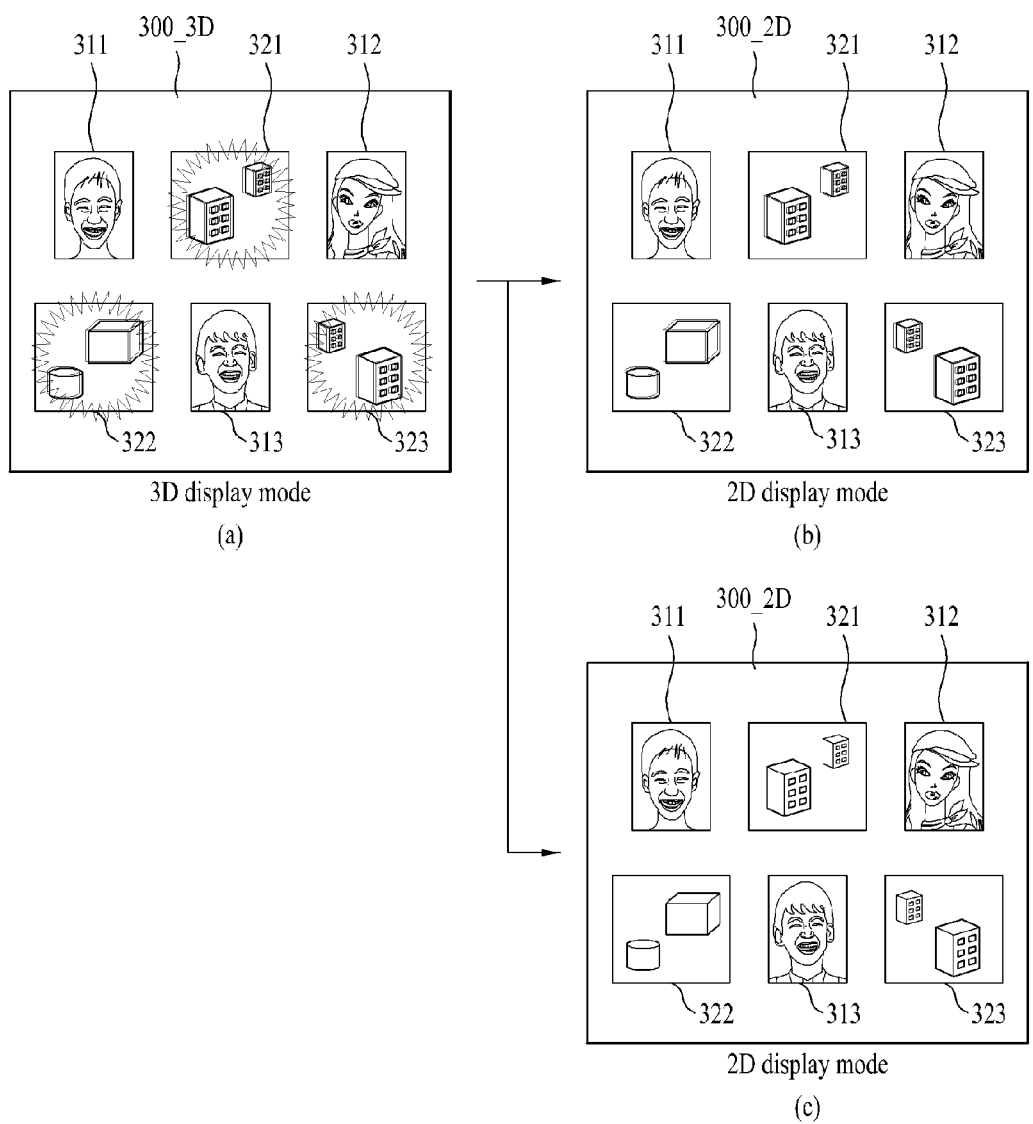
FIG. 19 is a diagram of screen configurations of a process of changing the display mode.

FIG. 19 shows a display mode changing process. According to this process, while images currently having the same dimensions of a 3D display mode of the display unit are emphasized by one of the processes shown in FIGS. 6 to 17, if a prescribed image having dimensions different from those of the display mode is selected, a current display of the display unit may be changed into a display mode of the same dimensions of the selected image.

While the 3D images 321 to 323 currently having the same dimensions of a 3D display mode of the display unit 151 are emphasized by one of the processes shown in FIGS. 6 to 17 [FIG. 19 (a)], if an image 311 is selected from the 2D images 311 to 313, the controller 180 may change the current 3D display of the display unit 151 into a 2D display mode [FIG. 19 (b)].

In particular, in order for the user-selected 2D image 311 to be optimally displayed on the current display unit 151, the controller 180 may change the 3D display mode of the display unit 151 into the 2D display mode.

If the 2D image 311 is selected by a user, while the 3D display mode of the display unit 151 is changed into the 2D display mode, the controller 180 may be able to further change the 3D images 321 to 323 into 2D images.

In particular, as the 2D images corresponding to left and right eye images of the 3D images 321 to 323 are provided to the memory 160, the controller 180 may display the left or right eye images of the 3D images 321 to 323.

So far, the 1$^{st}$ embodiment of the present invention is described in detail with reference to FIGS. 7 to 19.

In the following description, a 2$^{nd}$ embodiment of the present invention may be explained in detail with reference to FIGS. 20 to 22.

2$^{nd}$ Embodiment

A 2$^{nd}$ embodiment of the present invention relates to a process for emphasizing and displaying images. According to the 2$^{nd}$ embodiment of the present invention, when a list having 2D images and 3D images mixed therein is displayed, a 1$^{st}$ UI for setting a display mode of the display unit to one of 2D and 3D is provided to a screen having the list displayed thereon. If the display mode of the display unit 151 is set via the 1$^{st}$ UI, images having the same dimensions of the set display mode may be displayed with greater emphasis over other images having different dimensions within the list.

Figure 20:
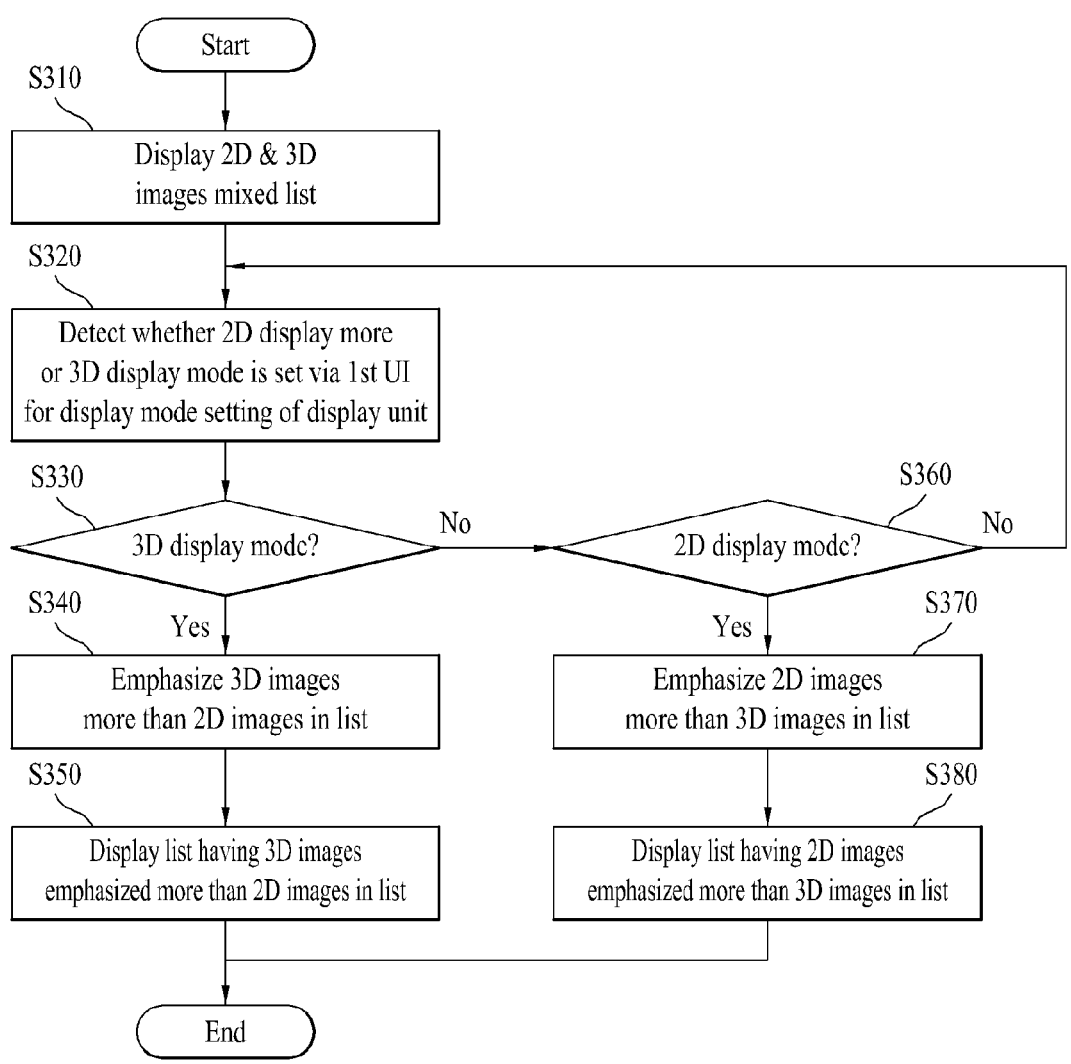
FIG. 20 is a flowchart of a process for identifiably displaying 2D images and 3D images in a list having the 2D images and 3D images mixed together therein in accordance with a 2D or 3D display mode of a display unit according to a second embodiment of the present invention.

FIG. 20 is a flowchart of a process for identifiably displaying 2D images and 3D images in a list having the 2D and 3D images mixed together therein in accordance with a 2D or 3D display mode of a display unit according to a 2$^{nd}$ embodiment of the present invention.

Figure 21:
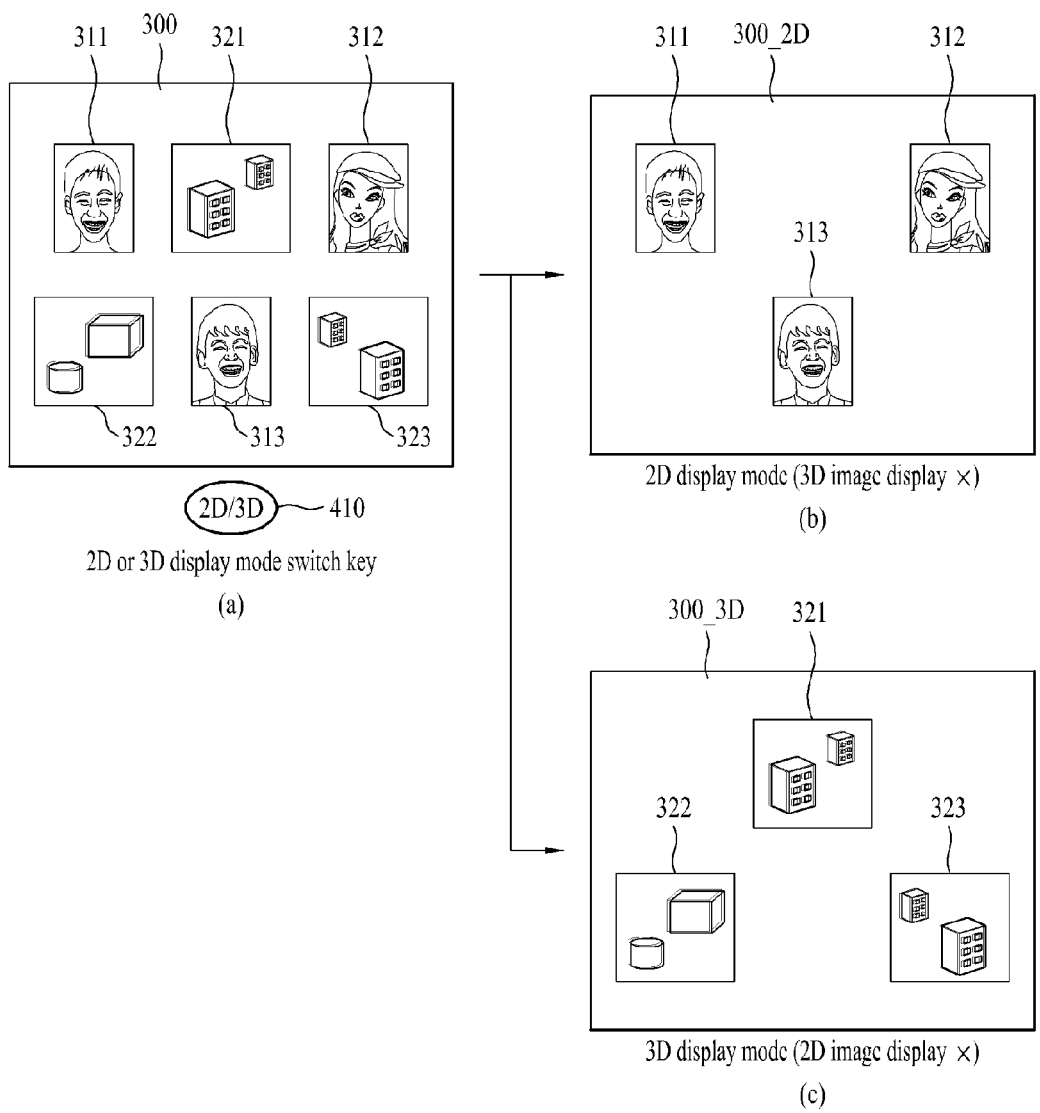
FIG. 21 and FIG. 22 are diagrams of screen configurations of a process for identifiably displaying 2D images and 3D images in a list having the 2D and 3D images mixed together therein in accordance with a 2D or 3D display mode of a display unit according to a $2^{nd}$ embodiment of the present invention.
Figure 22:
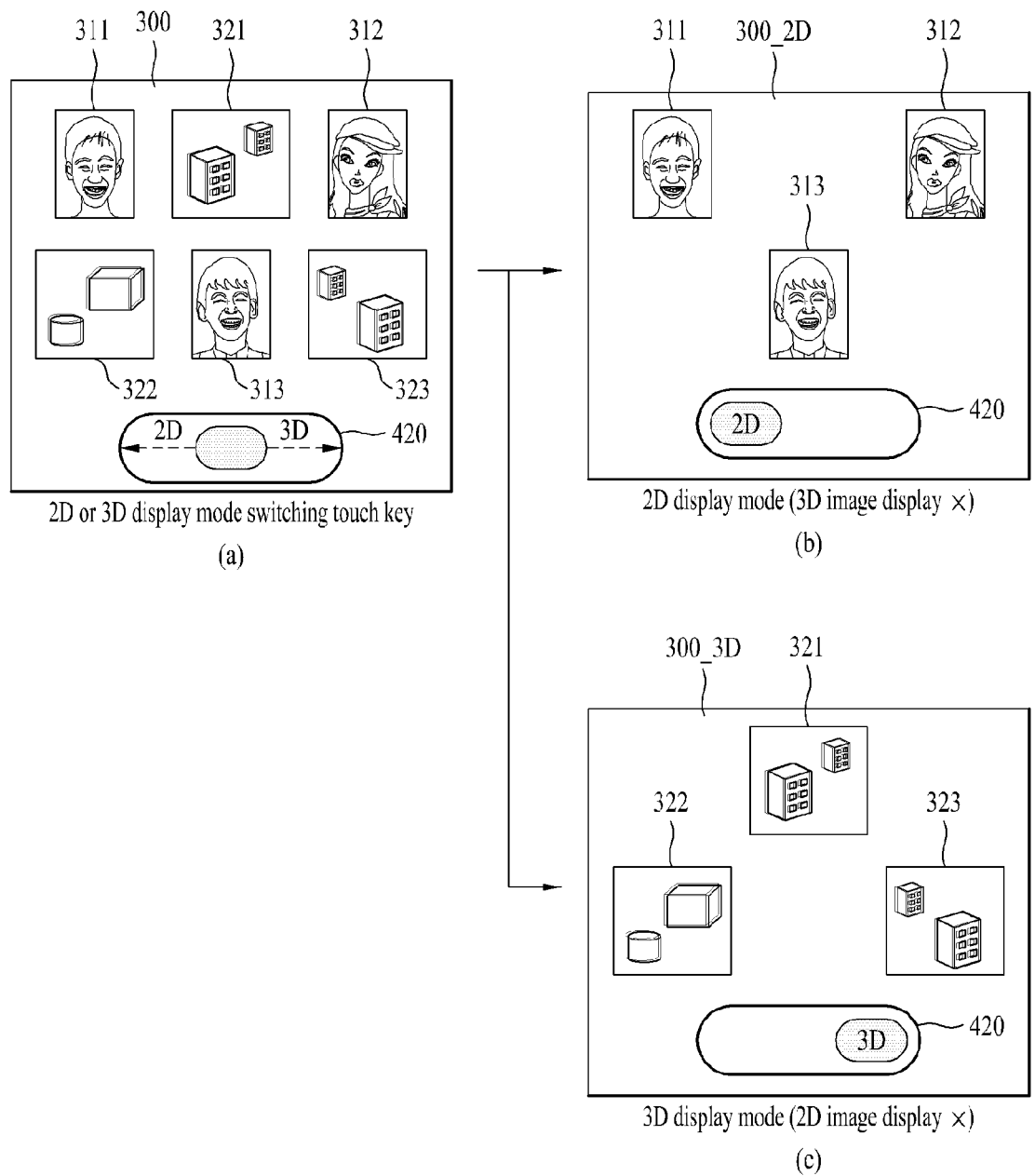

FIG. 21 and FIG. 22 depict screen configurations of a process for identifiably displaying 2D images and 3D images in a list having the 2D and 3D images mixed together therein in accordance with a 2D or 3D display mode of a display unit according to a 2$^{nd}$ embodiment of the present invention.

Referring to FIGS. 20 to 22, while a list 300 having 2D images and 3D images mixed therein is displayed on the display unit 151 [S310], the controller 180 of the mobile terminal 100 may detect whether a display mode of the display unit 151 is set to 2D or 3D via a 1$^{st}$ UI 410/420 for 2D/3D display mode setting of the display unit 151 [S320] [FIG. 21 (a)/FIG. 22 (a)].

In this case, the 1$^{st}$ UI 410, as shown in FIG. 21, may include a key, to which the 2D/3D display mode setting function is assigned, among physical keys provided to the user input unit 130.

Alternatively, the 1$^{st}$ UI 420, as shown in FIG. 22, may include a touch key displayed within a touchscreen 130, to which the 2D/3D display mode setting function is assigned.

If the user sets the display mode of the display unit 151 to 3D via the 1$^{st}$ UI 410/420 [S330], the controller 180 may control the 3D images 321 to 323 to be emphasized more than the 2D images 311 to 313 in order for the 3D images 321 to 323 to be identified better than the 2D images 311 to 313 within the list 300 [S340]. The controller 180 may then display a list 300_3D in which the 3D images 321 to 323 are emphasized [S350] [FIG. 21 (c)/FIG. 22 (c)].

On the other hand, if the user sets the display mode of the display unit 151 to 2D via the 1$^{st}$ UI 410/420 [S360], the controller 180 may control the 2D images 311 to 313 to be emphasized more than the 3D images 321 to 323 in order for the 2D images 311 to 313 to be identified better than the 3D images 321 to 323 within the list 300 [S370]. The controller 180 may then display a list 300_2D in which the 2D images 311 to 313 are emphasized [S380] [FIG. 21 (b)/FIG. 22 (b)].

In doing so, in the same manner of the processes shown in FIGS. 8 to 19, in accordance with the display mode of the display unit 151 ser via the 1$^{st}$ UI 410/420, the controller 180 may be able to display the 2D images 311 to 313 or the 3D images 321 to 323 to be emphasized within the list 300.

3$^{rd}$ Embodiment

A 3$^{rd}$ embodiment of the present invention relates to a process for emphasizing and displaying images. According to the 3$^{rd}$ embodiment of the present invention, when a list having 2D images and 3D images mixed therein is displayed, a 2$^{nd}$ UI for setting dimensions of 2D or 3D is provided to a screen having the list displayed thereon. If the dimensions of the 2D or the 3D are set via the 2$^{nd}$ UI, images having the set dimensions may be displayed with greater emphasis over other images having dimensions different from the set dimensions within the list.

Figure 23:
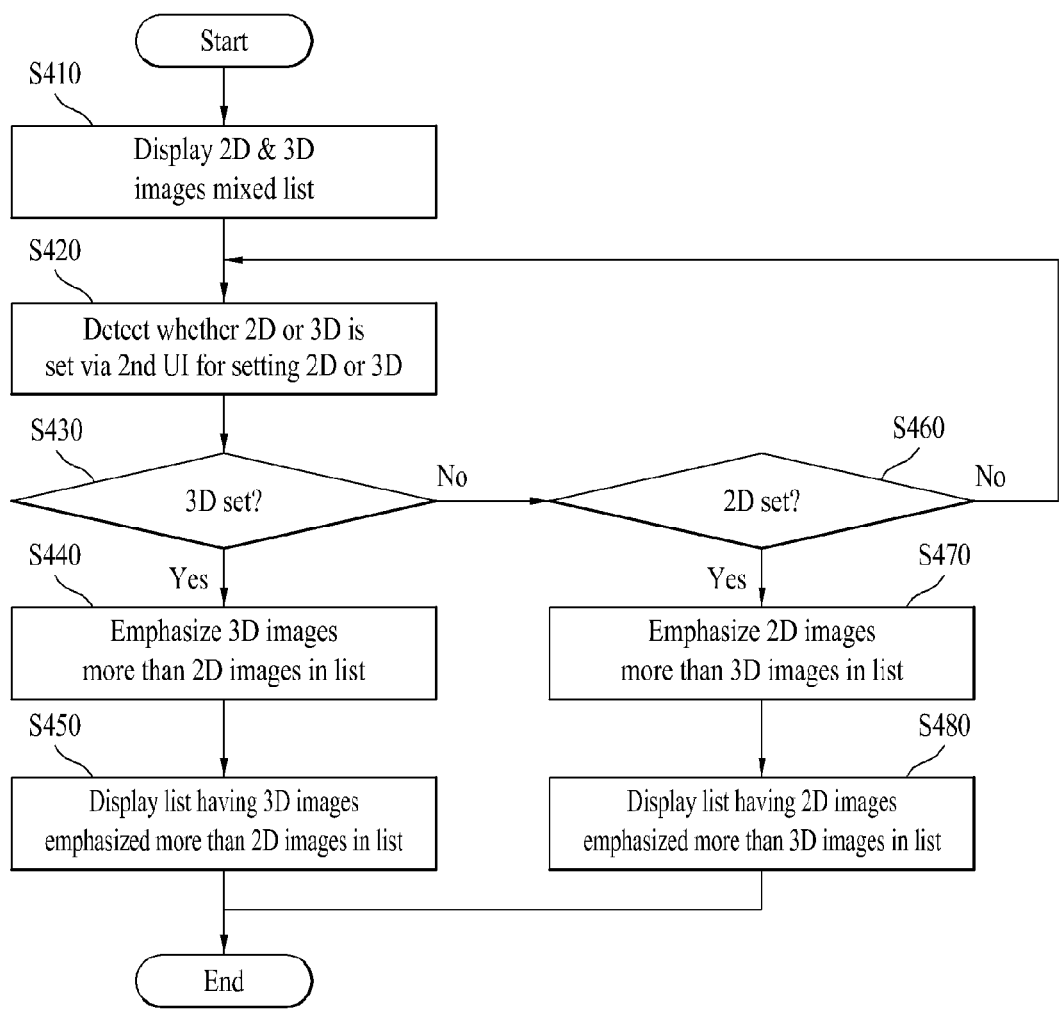
FIG. 23 is a flowchart of a process for identifiably displaying 2D images and 3D images in a list having the 2D and 3D images mixed together therein in accordance with a 2D or 3D display mode of a display unit according to a $3^{rd}$ embodiment of the present invention.

FIG. 23 is a flowchart of a process for identifiably displaying 2D images and 3D images in a list having the 2D and 3D images mixed together therein in accordance with a 2D or 3D display mode of a display unit according to a 3$^{rd}$ embodiment of the present invention.

Figure 24:
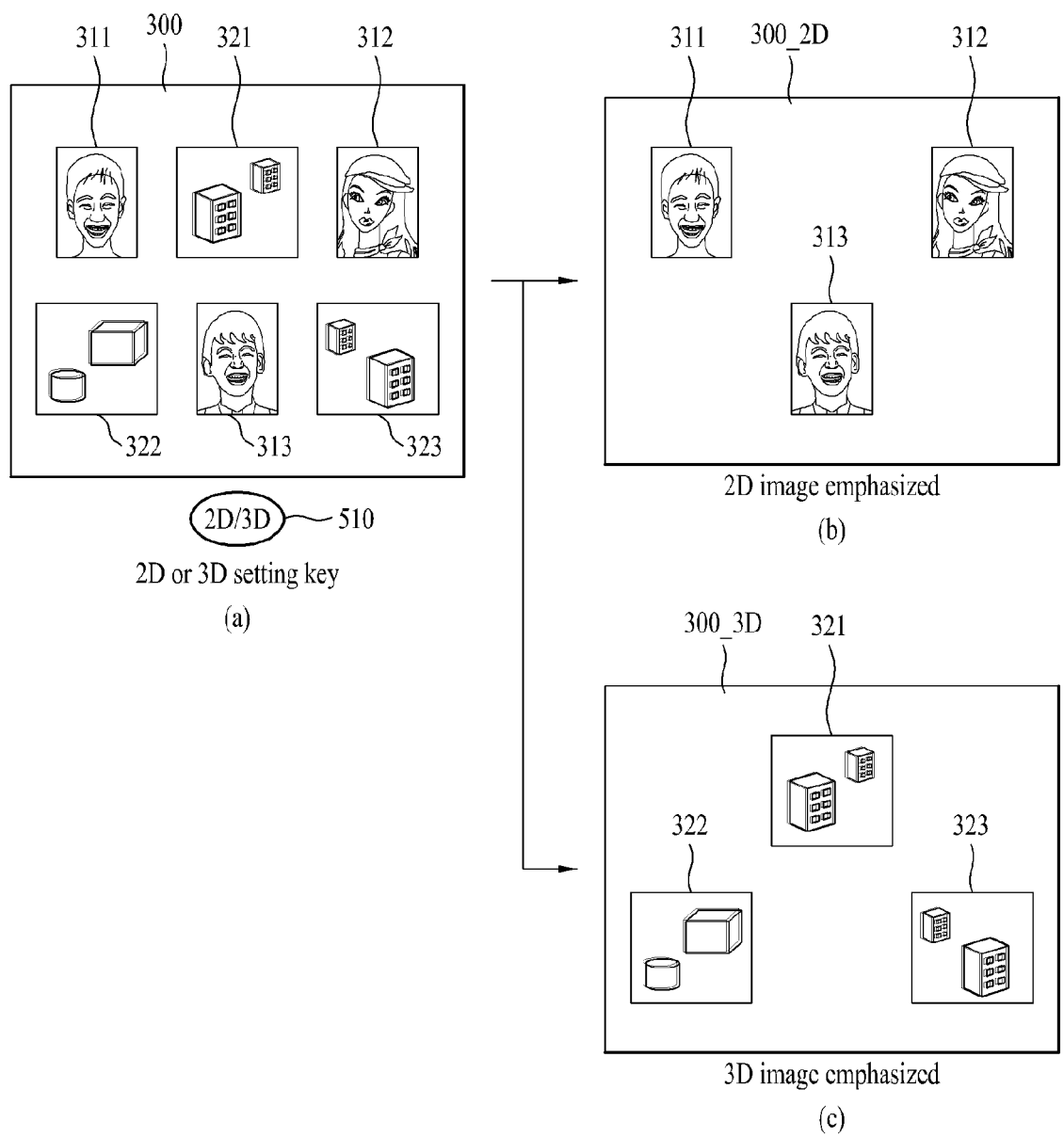
FIG. 24 and FIG. 25 are diagrams of screen configurations of a process for identifiably displaying 2D images and 3D images in a list having the 2D and 3D images mixed together therein in accordance with a 2D or 3D display mode of a display unit according to a third embodiment of the present invention.
Figure 25:
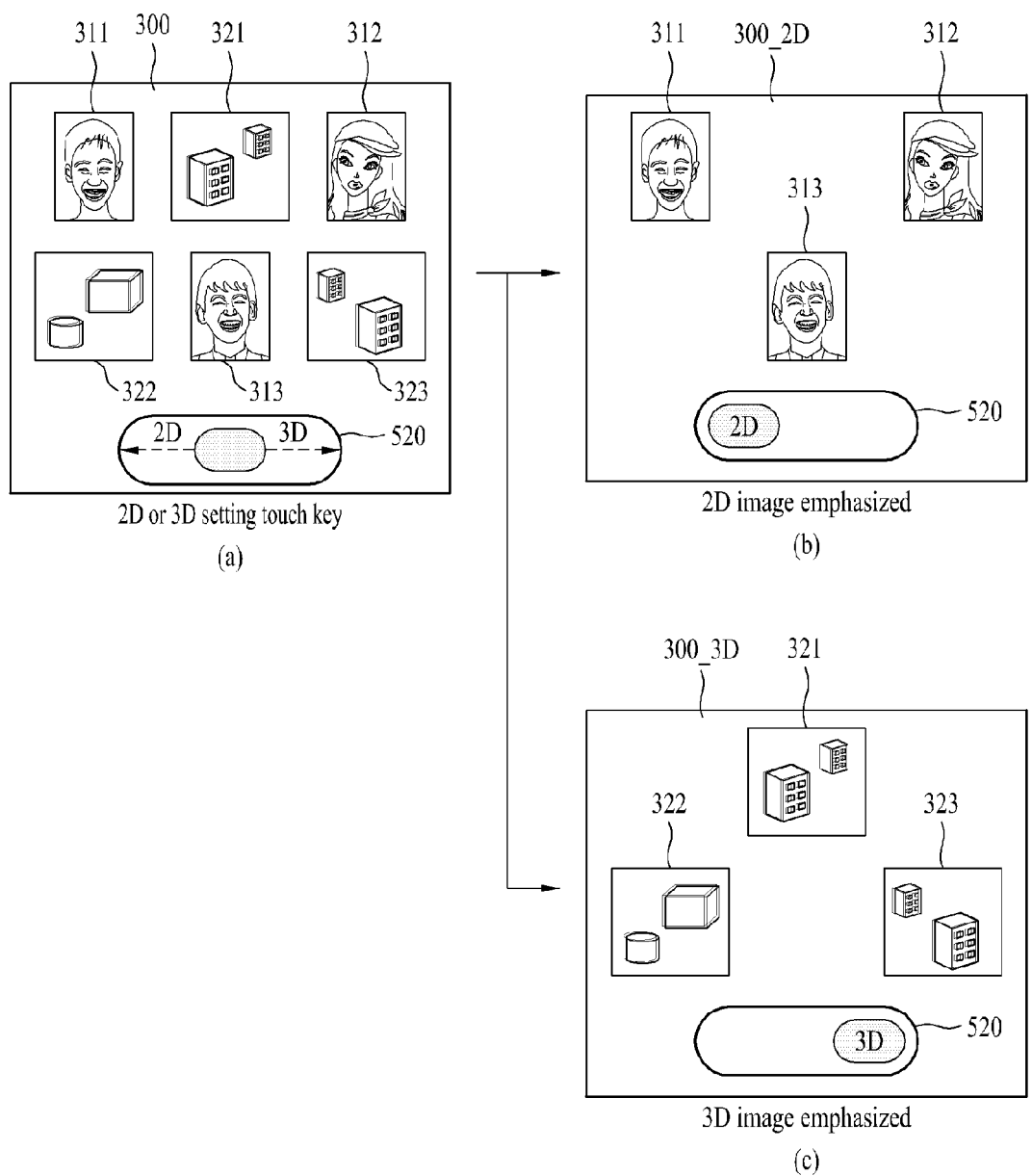

FIG. 24 and FIG. 25 are diagrams of screen configurations of a process for identifiably displaying 2D images and 3D images in a list having the 2D and 3D images mixed together therein in accordance with a 2D or 3D display mode of a display unit according to a 3$^{rd}$ embodiment of the present invention.

Referring to FIGS. 23 to 25, while a list 300 having 2D images and 3D images mixed therein is displayed on the display unit 151 [S410], the controller 180 of the mobile terminal 100 may detect whether 2D or 3D is set via a 2$^{nd}$ UI 510/520 for 2D/3D setting [S420] [FIG. 24 (a)/FIG. 25 (a)].

In this case, the 2$^{nd}$ UI 510, as shown in FIG. 24, may include a key, to which the 2D/3D setting function is assigned, among physical keys provided to the user input unit 130.

Alternatively, the 2$^{nd}$ UI 520, as shown in FIG. 25, may include a touch key displayed within a touchscreen 130, to which the 2D/3D setting function is assigned.

If the user sets the 3D via the 2$^{nd}$ UI 510/520 [S430], the controller 180 may control the 3D images 321 to 323 to be emphasized more than the 2D images 311 to 313 in order for the 3D images 321 to 323 to be identified better than the 2D images 311 to 313 within the list 300 [S440]. The controller 180 may then display a list 300_3D in which the 3D images 321 to 323 are emphasized [S450] [FIG. 24 (c)/FIG. 25 (c)].

On the other hand, if the user sets the 2D via the 2$^{nd}$ UI 510/520 [S460], the controller 180 may control the 2D images 311 to 313 to be emphasized more than the 3D images 321 to 323 in order for the 2D images 311 to 313 to be identified better than the 3D images 321 to 323 within the list 300 [S470]. The controller 180 may then display a list 300_2D in which the 2D images 311 to 313 are emphasized [S480] [FIG. 24 (b)/FIG. 24 (b)].

In particular, according to the 3$^{rd}$ embodiment of the present invention, without considering the display mode of the display unit 151, if a user sets the 2D or the 3D, images having the set dimensions may be displayed by being emphasized.

Meanwhile, in the same manner of the processes shown in FIGS. 8 to 19, in accordance with the 2D or 3D set via the 2$^{nd}$ UI 510/520, the controller 180 may be able to display the 2D images 311 to 313 or the 3D images 321 to 323 to be emphasized within the list 300.

4th Embodiment

A 4th embodiment of the present invention relates to a process for emphasizing and displaying images. According to the 4th embodiment of the present invention, when a list having 2D images and 3D images mixed therein is displayed, and a touch gesture having a pattern corresponding to 2D o 3D is input to the screen, images having the dimensions corresponding to the input touch gesture may be displayed with greater emphasis over other images having dimensions different from the set dimensions within the list.

Figure 26:
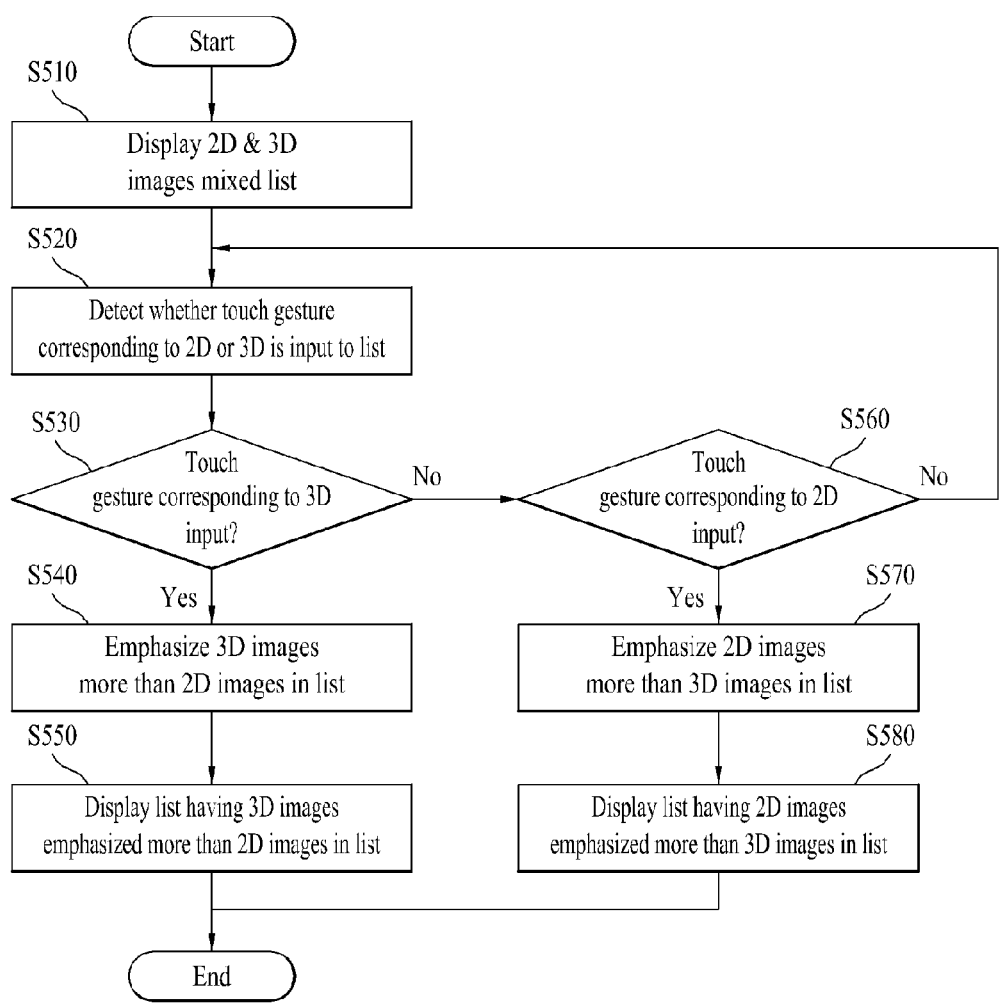
FIG. 26 is a flowchart of a process for identifiably displaying 2D images and 3D images in a list having the 2D and 3D images mixed together therein in accordance with a 2D or 3D display mode of a display unit according to a fourth embodiment of the present invention.

FIG. 26 is a flowchart of a process for identifiably displaying 2D images and 3D images in a list having the 2D and 3D images mixed together therein in accordance with a 2D or 3D display mode of a display unit according to a 4th embodiment of the present invention.

Figure 27:
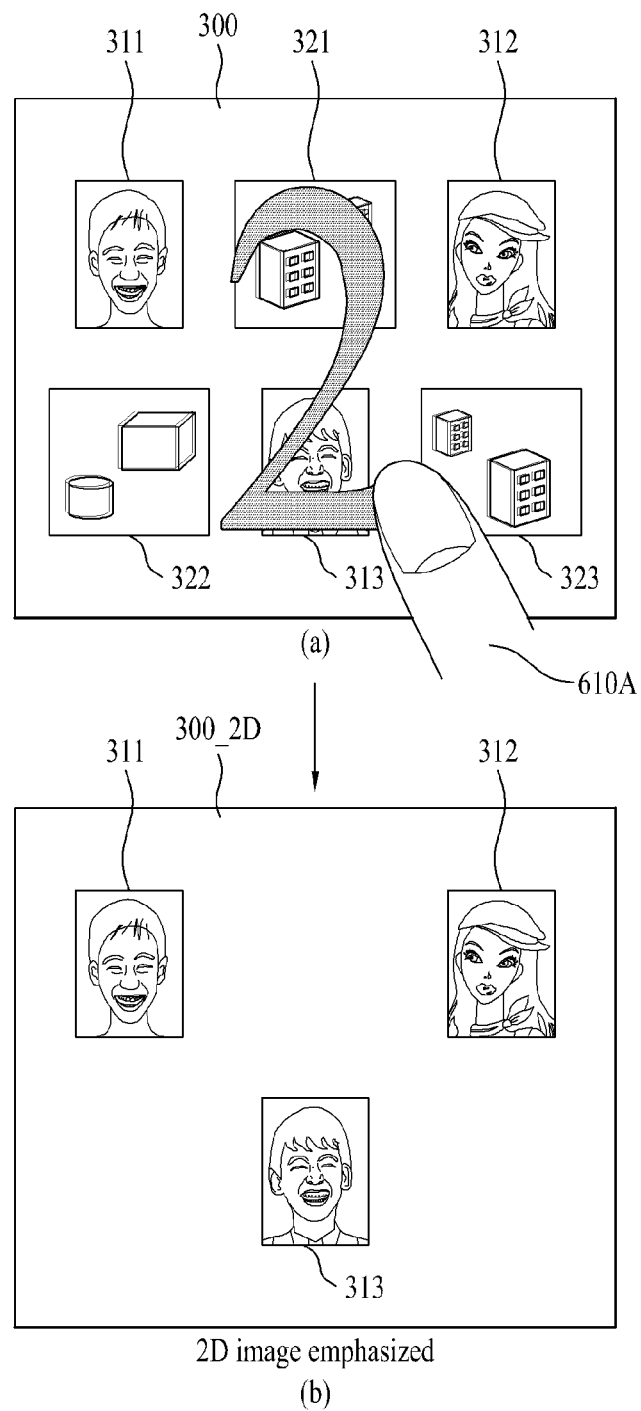
FIG. 27 and FIG. 28 are diagrams of screen configurations of a process for identifiably displaying 2D images and 3D images in a list having the 2D and 3D images mixed together therein in accordance with a 2D or 3D display mode of a display unit according to the fourth embodiment of the present invention.
Figure 28:
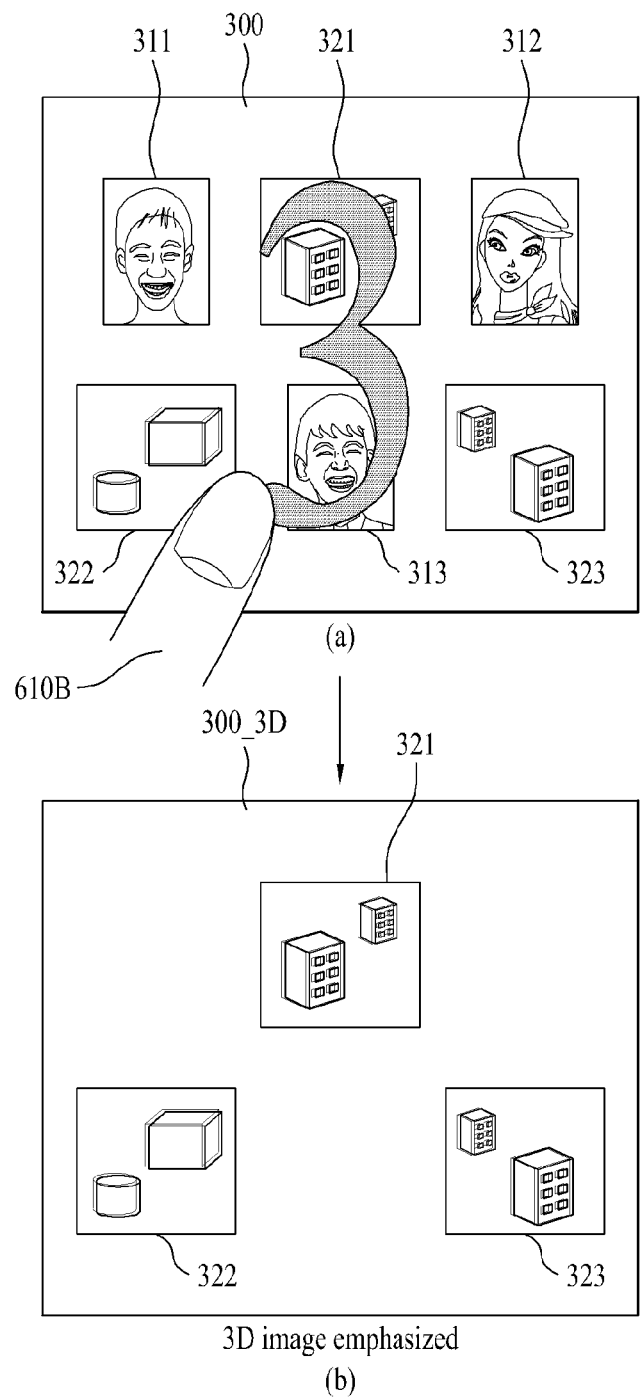

FIG. 27 and FIG. 28 are diagrams of screen configurations of a process for identifiably displaying 2D images and 3D images in a list having the 2D and 3D images mixed together therein in accordance with a 2D or 3D display mode of a display unit according to a 4th embodiment of the present invention.

Referring to FIGS. 26 to 28, while a list 300 having 2D images and 3D images mixed therein is displayed on the touchscreen 151 [S510], the controller 180 of the mobile terminal 100 may detect whether a touch gesture 610A/610B having a pattern corresponding to 2D/3D is input [S520].

As a result of the detecting, if a user inputs the touch gesture 610B corresponding to the 3D [S530] [FIG. 28 (a)], the controller 180 may control the 3D images 321 to 323 to be further emphasized than the 2D images 311 to 313 in order for the 3D images 321 to 323 to be identified better than the 2D images 311 to 313 within the list 300 [S540]. The controller 180 may then display a list 300_3D in which the 3D images 321 to 323 are emphasized [S550] [FIG. 28 (b)].

On the other hand, as a result of the detecting, if a user inputs the touch gesture 610A corresponding to the 2D [S560], the controller 180 may control the 2D images 311 to 313 to be further emphasized than the 3D images 321 to 323 in order for the 2D images 311 to 313 to be identified better than the 3D images 321 to 323 within the list 300 [S570]. The controller 180 may then display a list 300_2D in which the 2D images 311 to 313 are emphasized [S580] [FIG. 27 (b)].

Meanwhile, in the same manner of the processes shown in FIGS. 8 to 19, in accordance with the 2D or 3D set via the touch gesture, the controller 180 may be able to display the 2D images 311 to 313 or the 3D images 321 to 323 to be emphasized within the list 300.

Accordingly, the present invention provides the following effects and/or advantages.

First of all, according to at least one of embodiments of the present invention, the present invention emphasizes and displays images having the same dimensions of a current display mode (e.g., 2D, 3D) of a display unit within a list having 2D and 3D images contained therein, thereby enabling a user to select and view images suitable for the current display mode of the display unit.

Secondly, the present invention enables a user to selectively view 2D images or 3D images within a list having the 2D and 3D images mixed therein.

Thirdly, the present invention enables a user to quickly identify 2D images or 3D images within a list having the 2D and 3D images mixed therein.

It will be apparent to those skilled in the art that various modifications and variations can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a memory configured to store images;
a display unit configured to display images in either a two dimension (2D) format display mode or a three dimensional (3D) format display mode; and
a controller configured to:
control the display unit to display a list including first image items and second image items when a command for displaying a list is input, the first image items being displayed as at least one first image type and the first image items having a 2D format, the second image items being displayed as at least one second image type and the second image items having a 3D format,
control the at least one first image type or the at least one second image type having a same format as a current format of a display mode of the display unit to be distinguishably displayed from another of the at least one first image type or the at least one second image type having a format different than the current format of the display mode,
create an icon by compressing either the first image items or the second image items having a format different than the current format of the display mode into one item, and
control the display unit to display the created icon within the list instead of either the first image items or the second image items having a format different than the current format of the display mode.

2. The mobile terminal of claim 1, wherein the controller displays the at least one first image type and the at least one second image type as thumbnails.

3. The mobile terminal of claim 1, wherein the controller controls a first image item having a same format as the format of a current display mode to be emphasized more than a second image item having a format different than the current display mode.

4. The mobile terminal of claim 3, wherein the controller displays the first image item to be larger than the second image item.

5. The mobile terminal of claim 3, wherein the controller displays the first image item by blinking the first image item.

6. The mobile terminal of claim 3, wherein the controller displays the second image item by darkening a color of the second image item or transparently displaying the second image item.

7. The mobile terminal of claim 3, wherein the controller displays the first image item and the second image item by separating the first image item and the second image item from each other within the list.

8. The mobile terminal of claim 3, wherein the controller displays information indicating a format of an image data on the first image item.

9. The mobile terminal of claim 3, wherein if the display mode of the display unit is the 3D format display mode, the controller displays information indicating a 3D depth level on the first image item.

10. The mobile terminal of claim 9, wherein the information indicating the 3D depth level is represented as a histogram.

11. The mobile terminal of claim 3, wherein if the second image item is selected, the controller changes the display mode of the display unit into the display mode to be the format of the selected image item.

12. The mobile terminal of claim 3, wherein if the second image item is selected, the controller changes the selected second image item to have the same format of the display mode of the display unit.

13. The mobile terminal of claim 3, wherein if the second image item is selected, the controller displays information indicating that the selected image item has a format different from the display mode of the display unit.

14. The mobile terminal of claim 3, wherein the controller displays a first user interface (UI) for setting the display mode of the display unit to one of the 2D format display mode and the 3D format display mode, and
wherein if the display mode of the display unit is set via the first UI, the controller controls the first image item having a same format as the format of the set display mode to be emphasized more than the second image item having a format different than the format of the display mode.

15. The mobile terminal of claim 3, wherein the controller displays a second UI for setting the display mode of the display unit to one of the 2D display mode and the 3D display mode, and
wherein if the display mode of the display unit is set to either the 2D display mode or the 3D display mode via the second UI, the controller controls the first image item having the same format of the set display mode to be emphasized more than the second image item having a format different than the format of the set display mode.

16. The mobile terminal of claim 1, wherein the display unit comprises a touchscreen, and
wherein if a touch gesture corresponding to either the 2D format display mode or the 3D format display mode is input to the touchscreen, the controller controls the first image item having the format corresponding to the input touch gesture to be emphasized more than the second image item having a different format.

* * * * *